US00RE48314E

(19) United States
(12) Reissued Patent
Alexander et al.

(10) Patent Number: US RE48,314 E
(45) Date of Reissued Patent: Nov. 17, 2020

(54) FILTER STRUCTURE FOR ITERATIVE SIGNAL PROCESSING

(71) Applicant: Cohda Wireless Pty. Ltd., Kent Town (AU)

(72) Inventors: Paul Dean Alexander, Prospect (AU); Alexander James Grant, North Adelaide (AU); Lars Kildehoj Rasmussen, North Adelaide (AU); Stephen Peter Jakas, Hillcrest (AU)

(73) Assignee: Cohda Wireless Pty. Ltd, Kent Town (AU)

(21) Appl. No.: 15/442,374

(22) Filed: Feb. 24, 2017

Related U.S. Patent Documents

Reissue of:
(64) Patent No.: 8,964,865
Issued: Feb. 24, 2015
Appl. No.: 13/733,618
Filed: Jan. 3, 2013

U.S. Applications:
(62) Division of application No. 12/195,492, filed on Aug. 21, 2008, now Pat. No. 8,411,767, which is a division
(Continued)

(30) Foreign Application Priority Data

Jul. 24, 2003 (AU) ..... 2003903826

(51) Int. Cl.
*H04L 12/16* (2006.01)
*H04L 25/02* (2006.01)
(Continued)

(52) U.S. Cl.
CPC ..... *H04L 25/0202* (2013.01); *H04L 25/0204* (2013.01); *H04L 25/03171* (2013.01);
(Continued)

(58) Field of Classification Search
CPC ..... H04L 25/0202; H04L 25/0204; H04L 25/03171; H04L 27/2675; H04L 27/2657; H04L 27/2662
(Continued)

(56) References Cited

U.S. PATENT DOCUMENTS 5,127,051 A 6/1992 Chan et al.
5,136,612 A 8/1992 Bi
(Continued)

FOREIGN PATENT DOCUMENTS

AU 200038414 B2 11/2000
EP 1387544 A2 4/2004
(Continued)

OTHER PUBLICATIONS

Alexander et al., "Iterative Detection in Code-Division Multiple-Access with Error Control Coding," European Transactions on Telecommunications, Special Issue on CDMA Techniques for Wireless Communications Systems, vol. 9, No. 5, Sep.-Oct. 1998, pp. 419-426.
(Continued)

*Primary Examiner* — Colin M LaRose
(74) *Attorney, Agent, or Firm* — Schwegman Lundberg & Woessner, P.A.

(57) ABSTRACT

A method is for communicating by tracking time varying channels in a multiple access packet based communication network. Each packet includes a preamble portion including a data symbol, and a data portion including data symbols. The method may include initializing a channel estimate reference from an initial channel estimate based upon the data symbol in a preamble portion of a received packet, and updating the channel estimate reference based upon a channel estimate of a current data symbol and a previously received data symbol from the data symbols in a data portion of the received packet. The method may also include repeat-
(Continued)

Iterative Interference Canceling Receiver Structure ing the updating upon receipt of a subsequent data symbol from the data symbols in the data portion of the received packet.

25 Claims, 20 Drawing Sheets

Related U.S. Application Data of application No. 10/897,886, filed on Jul. 23, 2004, now Pat. No. 7,486,726.

(51) Int. Cl.
*H04L 25/03* (2006.01)
*H04L 27/26* (2006.01)

(52) U.S. Cl.
CPC ..... *H04L 27/2657* (2013.01); *H04L 27/2662* (2013.01); *H04L 27/2675* (2013.01)

(58) Field of Classification Search
USPC ..... 375/260, 267; 370/208
See application file for complete search history.

(56) References Cited

U.S. PATENT DOCUMENTS 5,282,155 A 1/1994 Jones
5,559,839 A 9/1996 Doelman
5,764,646 A 6/1998 Dent
5,909,466 A 6/1999 Labat et al.
5,966,262 A 10/1999 Brickner et al.
6,047,020 A 4/2000 Hottinen
6,161,209 A 12/2000 Moher
6,178,196 B1 1/2001 Naguib et al.
6,327,314 B1 12/2001 Cimini, Jr. et al.
6,359,935 B1 3/2002 Hui et al.
6,459,728 B1 * 10/2002 Bar-David ..... H04L 25/0202 375/231
6,460,160 B1 10/2002 Classon
6,477,210 B2 11/2002 Chuang et al.
6,483,821 B1 11/2002 Dabak et al.
6,539,067 B1 3/2003 Luschi et al. ..... H04L 25/0202 375/231
6,549,585 B2 4/2003 Naguib et al.
6,614,857 B1 * 9/2003 Buehrer ..... H04L 25/0236 375/340
6,618,452 B1 9/2003 Huber et al.
6,650,714 B2 11/2003 Dogan et al.
6,671,338 B1 12/2003 Gamal et al.
6,687,492 B1 2/2004 Sugar et al.
6,700,919 B1 3/2004 Papasakellariou
6,704,376 B2 3/2004 Mills et al.
6,765,969 B1 7/2004 Vook et al.
6,768,713 B1 * 7/2004 Siala ..... H04B 7/08 370/203
6,907,084 B2 6/2005 Jeong
6,940,914 B1 * 9/2005 Lo ..... H04L 25/0236 370/208
6,956,815 B2 10/2005 Chiodini
6,993,070 B1 * 1/2006 Berthet ..... H04L 1/005 375/232
6,996,194 B2 * 2/2006 Pukkila ..... H04L 25/0212 375/340
7,023,935 B2 4/2006 Cao et al.
7,058,002 B1 6/2006 Kumagai et al.
7,092,436 B2 * 8/2006 Ma ..... H04L 25/0204 375/229
7,139,336 B2 11/2006 Nefedov
7,139,339 B2 11/2006 Yousef et al.
7,154,936 B2 12/2006 Bjerke et al.
7,161,896 B1 * 1/2007 Hart ..... H04L 25/0228 370/206
7,170,948 B2 1/2007 Berthet et al.
7,181,177 B2 2/2007 Pauli et al.
7,203,255 B2 4/2007 Wang et al.
7,227,887 B2 6/2007 Yoon
7,251,274 B1 7/2007 Labat et al.
7,256,737 B2 8/2007 Hall et al.
7,292,833 B2 11/2007 Marro et al.
7,298,801 B2 11/2007 Roumy et al.
7,313,400 B2 * 12/2007 Moon ..... H04L 5/0048 370/335
7,324,437 B1 1/2008 Czylwik et al.
7,324,585 B2 1/2008 McDonough et al.
7,453,793 B1 * 11/2008 Jones, IV ..... H04L 25/0216 370/203
7,474,688 B2 1/2009 McDonough et al.
2001/0017903 A1 8/2001 Naguib et al.
2001/0053143 A1 12/2001 Li et al.
2002/0031170 A1 3/2002 Yoon
2002/0067782 A1 6/2002 Wilhelmsson
2002/0101840 A1 * 8/2002 Davidsson et al. ..... 370/330
2002/0168017 A1 11/2002 Berthet et al.
2002/0181509 A1 12/2002 Mody et al.
2003/0021332 A1 * 1/2003 Li ..... 375/147
2003/0031278 A1 * 2/2003 Kang ..... H04L 1/0055 375/341
2003/0095590 A1 5/2003 Fuller et al.
2003/0103584 A1 6/2003 Bjerke et al.
2003/0112825 A1 6/2003 Wang et al.
2003/0128656 A1 7/2003 Scarpa
2003/0152021 A1 * 8/2003 Wang et al. ..... 370/208
2003/0156534 A1 8/2003 Coulson et al.
2003/0161415 A1 8/2003 Krupka
2003/0185284 A1 10/2003 Yousef et al.
2003/0236081 A1 12/2003 Braun
2004/0001564 A1 1/2004 Chan et al.
2004/0004997 A1 1/2004 Boesel et al.
2004/0005010 A1 1/2004 He et al. ..... H04L 25/0204 375/260
2004/0008614 A1 1/2004 Matsuoka et al.
2004/0047435 A1 3/2004 Su
2004/0062297 A1 4/2004 McDonough et al.
2004/0062299 A1 4/2004 McDonough et al.
2004/0081074 A1 * 4/2004 Piechocki ..... H04L 1/0618 370/206
2004/0081205 A1 4/2004 Coulson
2007/0064775 A1 3/2007 Petre et al.
2007/0092015 A1 * 4/2007 Hart et al. ..... 375/260

FOREIGN PATENT DOCUMENTS

JP 2002232389 A 8/2002
WO 0158105 A1 8/2001
WO 0223781 A1 3/2002
WO 0239597 A2 5/2002
WO 03094037 A1 11/2003
WO 2004006525 A1 1/2004

OTHER PUBLICATIONS

Czylwik, "Synchronization for Systems with Antenna Diversity," VTC '99, Deutsche Telekom AG, Technologieszentrum, 1999, pp. 728-732.

Alexander et al., "Iterative Multiuser Interference Reduction: Turbo CDMA," IEEE Transactions on Communications, vol. 47, No. 7, Jul. 1999, pp. 1008-1014).

Rasmussen et al., "Recursive Filters for Iterative Multiuser Decoding," ISIT 2002, Lausanne, Switzerland, Jun. 30-Jul. 5, 2002, p. 445.

Singapore Intellectual Property Office, written opinion for companion application Singapore j200805473-6, mailed Dec. 20, 2010.

* cited by examiner

Generic iterative receiver structure

The transmission system model for coded CDMA

Canonical iterative multiuser decoder

Iterative multiuser decoder with linear multiuser estimation

The recursive filter $\Lambda_k^{(n)}$ For $(n = 1)$ the input signal is r while for $n \geq 2$ the input signal is $\hat{\chi}_k(n - 1)$ BER versus users after 10 iterations, $N = 8$, $E_b / N_0 = 5$ dB Iterative Interference Canceling Receiver Structure

AMENDED

AMENDED

NEW

NEW

NEW

FILTER STRUCTURE FOR ITERATIVE SIGNAL PROCESSING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a divisional of pending U.S. application Ser. No. 12/195,492 filed Aug. 21, 2008, which is a divisional application of U.S. patent application Ser. No. 10/897,886, filed Jul. 23, 2004, which claims the benefit of Australian Patent Application No. 2003-903826 filed Jul. 24, 2003, PCT Application No. PCT/AU03/00502 filed Apr. 29, 2003, and Australian Patent Application No. PS 2053, the entire contents of these disclosures are hereby incorporated by reference in their entirety.

RELATED APPLICATIONS

This application is a division of U.S. patent application Ser. No. 10/897,886 filed 23 Jul. 2004, which claims benefit of and is a continuation-in-part of co-pending international application No. PCT/AU03/00502 entitled "Filter Structure for Iterative Signal Processing", filed 29 Apr. 2003, now WO 03/094037, which takes priority from Australian Provisional Patent Application No. PS2053, filed 2 May 2002, also entitled "Filter Structure for Iterative Signal Processing" and further claims benefit from Australian Provisional Patent Application No. 2003903826, filed 24 Jul. 2003, entitled "An OFDM Receiver Structure". The specifications of and, International application (PCT) are Incorporated herein by reference in their entirety and for all purposes.

FIELD OF INVENTION

The present invention relates to the field of wireless communications. In particular, the present invention relates to improved multiple access communications. In one form, the invention relates to an improved signal processing method and apparatus for a multiple access communication system. It will be convenient to hereinafter describe the invention in relation to the use of an iterative method of determining the reception of a signal in a multi user packet based wireless OFDM (Orthogonal Frequency Division Multiplexing) communication system, however, it should be appreciated that the present invention may not be limited to that use, only. By way of further example, in other forms the present invention may relate to recursive filtering for joint iterative decoding in a variety of systems and functions such as linear multiple access channel decoders, iterative equalisation, iterative joint channel estimation and detection/decoding, iterative space-time processing, iterative multi user interference cancellation and iterative demodulation.

RELATED ART

Throughout this specification the use of the word "inventor" in singular form may be taken as reference to one (singular) or more (plural) inventors of the present invention. The inventor has identified the following related art.

Most wireless communications systems are based on so-called multiple access techniques in which, information such as voice and data are communicated. This is a technology where many simultaneously active users share the same system resources in an organised manner. In most cases, sharing resources in a multiple access system means that if more than one user is active, then all active users interfere with each other. Traditionally, such interference has been considered to be part of the inevitable noise that corrupts transmissions.

Such interference increases with the number of active users and thus, the performance quality in terms of how many users (capacity) that can share the resources simultaneously becomes limited.

FIG. 1 shows an exemplary multiple access scenario that may occur in Wireless Networks. The radio terminals 102, 104 and 100b transmit signals that are received at network access point 100a. In general not all of these signals are intended for radio terminal 100a. They maybe signals from devices that belong to other networks, presumably in unlicensed radio spectrum. In any case there are ordinarily some users of interest that belong to the network to which 100a provides access. The Network aims to make arrangements for all of these signals to be effectively transmitted. Commonly the users may be required to share the radio resource by, for example, transmitting on different frequencies or at different times. Such techniques may be wasteful in terms of the expensive radio resource.

The radio terminal 102 may have an associated user 103 who generates and receives information (in the form of voice, video, data etc). Similarly, the radio terminal 102 is associated with a user. In the case of a vehicular user 105, the vehicle (such as bus, train, or car) may generate and receive data to be communicated over the network. This data may also be generated and received by the passengers and/or operators of the vehicle. The network access point 100b may also wish to communicate with radio terminal 100a as may be the case in wireless backhaul or multihop networks. In this respect, it is also possible that the other users' radio terminals 102, 104 may form part of any multihopping network.

One way to improve capacity is to introduce error control coding. Applying coding allows performance to be improved by only allowing a few of all possible combinations of code symbols to be transmitted. Another way is to exploit the information contained in the interference. This is known as joint multiuser detection. In systems where both these techniques are used, a decoding strategy may be applied which is termed iterative decoding. Here, a multiuser detector first provides an estimate of the transmitted symbols in terms of reliability information. This information is forwarded to decoders that also provide reliability information based on the input from the detector. Information is then exchanged in an iterative fashion until there are no further improvements. This decoding strategy may increase capacity significantly, getting very close to theoretical capacity limits at a complexity level within reach of practical implementation. However, an optimal multiuser detector is prohibitively complex for practical implementation, as the inherent complexity grows exponentially with the number of active users. Instead, linear multiuser detection based on linear filtering may be applied, where the corresponding complexity only grows linearly with the number of active users. The inventor has identified that for practical reasons related art linear filters for iterative joint multiuser decoding are based on the received signal and the most recent information from the decoders as input to the filter. These filters have been designed based on various optimality criteria.

Where multiple users share common communications resources, access to channel resources may be addressed by a multiple access scheme, commonly executed by a medium access control (MAC) protocol. Channel resources such as available bandwidth are typically strictly limited in a wireless environment. It is therefore desirable to use these resources as efficiently as possible. Allowing multiple users to share common resources creates a risk for disturbances and interference caused by colliding access attempts. Such disturbances are usually referred to as multiple access interference. In wireless local area network (WLAN) systems the MAC attempts to schedule transmissions from Stations in order to avoid collisions. Sometimes the MAC fails, and Stations access the channel resources simultaneously. An example of this situation is illustrated in FIG. 2, which shows the transmission of packets from a first transmitter station 1a second transmitter station 2 and, a representation of received packets at the access point shown on the lowermost line. Physical layer receivers may fail to recover such collided packets. As the traffic load on the network increases, this problem becomes a significant limiting factor in terms of network capacity and quality of service.

A different problem, leading to similar effects, is caused by the multipath nature of communication channels associated with, for example, a WLAN. The multipath channel causes several delayed replicas of the same signal to arrive at the receiver. This, in turn, creates self-interference similar in nature to multiple access interference discussed above. In this case, the problem becomes a limiting factor for the required power to achieve acceptable performance, which translates into limitations on the coverage of the WLAN. An example of a direct and a reflected version of the original signal arriving at the receiver is shown in FIG. 3, where the direct and reflected transmissions of the packet are illustrated on the top two lines as shown. The presence of self interference is indicated by shading in the received signal, represented by the access point on the lowermost line as shown. Transmission range may be affected by the interference mechanisms described above and also by the sophistication of the diversity signal processing at the Receiver. Physical Layer receiver designers therefore strive to ensure that effective use is made of all available time, frequency and space diversity (the latter may be provided through the use of multiple antennas).

The inventor has also identified that when synchronizing transmitted packets over wireless connections each packet ordinarily has a preamble of several repetitions of the same short signal. A received packet signal may be correlated with a delayed version of itself where commonly the delay equals the duration of the repeated signal component in the preamble. This correlation may be implemented repetitively over a given sample sequence. The output power of the resultant correlation may then be combined with the average power of the raw received signal to define a decision statistic. The point at which the decision statistic exceeds a given threshold is selected as the time of arrival of the packet. However, there are drawbacks with this technique in as much as signal distortions may be amplified or accentuated by the processing involved with the synchronization process producing uncertainties in the determination of packet timing.

Generally, in packet based communication systems it is important to reduce latency of a receiver or, in other words, provide as little delay as possible between arrival of signals and the decoding of the bits contained in those signals. Moreover, receiver processes are unable to determine the variation of a radio channel over the time of a packet length and the associated effect on the waveform of the transmitted signal. This may lead to lower than optimum data rates due to poorly tracked packets that are otherwise intact being discarded.

In OFDM packet based communication systems channel impairments may occur, which contribute to changing both the channel over which an OFDM signal travels and also the received signal itself. Collectively, these channel impairments comprise variations in the transmission channel due to multipath fading and, variations to OFDM symbols due to frequency and time offsets caused by receiver inaccuracies and phase offsets due to combined transmission and reception processes. These channel impairments may vary from OFDM symbol to OFDM symbol, in other words, they may not be invariant over the length of a packet. Traditionally, channel impairments are countered by estimates made using a packet preamble and maintained by pilot symbols throughout the received packet, which may assume invariance over the packet length. Other methods use data estimates to aid for example with channel estimation and these are implemented in the frequency domain and may result in power loss by discarding a cyclic prefix for each received symbol. Generally, there is no use made of all available received information to address channel impairments in such packet based communication systems.

With regard to space diversity, for multiple receiving antennae in wireless data packet communication systems related art schemes provide decisions on the synchronization of a received signal on the basis of per antenna and then a majority vote, otherwise the received measurements are added prior to the decision. These approaches do not address the variation of signal statistics across the number of antennae resulting in degraded synchronization accuracy and increased packet loss.

In EP 1387544 it is noted that time synchronisation of a receiver to the incoming signal is essential for effective decoding of that signal. In many packet based applications a special preamble is inserted by the transmitter at the start of every packet transmitted in order to assist the receiver with its timing estimation task. In OFDM systems the transmitter imparts a special structure on the signal called a cyclic prefix. This cyclic prefix is inserted for every OFDM symbol. A cyclic prefix is a replica of a small portion of the last section of a signal inserted at the start of the signal. There are many OFDM symbols transmitted sequentially in most forms of communication. In EP 1387544 the cyclic prefix, in the form of a guard interval as a cyclic continuation of the last part of the active symbol, is employed to time synchronise the receiver instead of a preamble. In EP 1387544 a two step time synchronisation approach is disclosed, namely a pre-FFT and post-FFT time synchronisation algorithm. These are complementary techniques and may be used together. The pre-FFT technique consists of a "delay and correlate" algorithm applied to find the cyclic prefix of the OFDM symbols. This is achieved by setting the delay in the "delay and correlate" algorithm to the distance between the cyclic prefix and the region from which it was copied. The output of the correlator is then filtered using an auto-regression filter comprising a recursive Infinite-Impulse Response (IIR) filter to determine an average of the correlation across OFDM symbols. A second filtering, by way of smoother 44 in FIG. 2 of EP 1387544, is then applied to discard samples outside of the maximum delay measurable, namely, the cyclic prefix duration. However, EP 1387544 relates to a system which makes use of a streaming signal and not readily adapted for the random arrival of packets. In the case of streaming signal, the signal is always there but the fine timing associated with the OFDM symbol boundaries must be determined.

In U.S. Pat. No. 6,327,314 (Cimini, Jr. et al) the problem of tracking the radio channel in a hostile propagation environment is addressed for wireless communications systems using OFDM and one or more antennae for reception. The solution disclosed by Cimini Jr. employs decoder and demodulator outcomes to generate a training or, reference signal, to drive the estimation of the channel for use in decoding the next symbol. The decoding, demodulation and channel estimation loops run according to the paradigm that the channel estimate may use all outcomes up to and including the symbol to be decoded. Each OFDM symbol is decoded once. The raw channel estimate is obtained by multiplying the received OFDM symbol with the training symbols. These training symbols may be from a decoding step. The raw channel estimate, corresponding to one OFDM symbol, is stored in a database. Each time a new OFDM symbol is to be processed all raw estimates in the database are employed to yield the channel estimate at the processing wavefront. In this disclosure the raw channel estimates are stored and a smoothing step is executed every time the data base is accessed, which entails a relative degree of complexity.

In U.S. Pat. No. 6,477,210 (Chuang et al) the problem of tracking the radio channel in a hostile propagation environment is also addressed for wireless communications systems using OFDM and one or more antennae for reception. The solution provided in this disclosure augments that disclosed in U.S. Pat. No. 6,327,314 by more clearly disclosing the processing flow and adding a backward recursion to the processing. The backward recursion includes the steps of demodulation, decoding and channel estimation, as in the forward recursion, but the processing commences from the end of the packet. Chuang et al is restricted to Maximum Likelihood decoding systems such as Viterbi decoders. There are many other types of FEC systems that do not employ ML decoding (e.g. Soft Output Decoders such as A-Posterior Probability techniques) and, moreover, for which Chuang is not adapted to operate within.

In a paper by Czylwik, A., entitled "Synchronization for systems with antenna diversity", IEEE Vehicular Technology Conference, Vol. 2, 19-22 Sep. 1999, pp 728-732 the time and frequency synchronisation of a receiver is considered. In order to successfully decode a packet the receiver must determine the packet time of arrival. Errors in this estimate may result in signal power loss or failures in the synchronisation of high layer structures such as error control coding and FFT windows. Another parameter to be estimated is residual frequency offset. This parameter must be accurately estimated and its effect removed or countered if the packet is to be decoded. Errors in this estimate may result in demodulator failure and subsequent packet decode failure. When a receiver has two antennae there is a possibility to employ these two signals to improve estimation of time and frequency offsets. As disclosed in Czylwik, conventional techniques for single antenna exist involving the calculation and subsequent combination of two components. In this paper two main methods are proposed for time and frequency offset estimation. In the first, one antenna is selected, based on received power strength, and conventional techniques are applied to only that signal. In the second method disclosed by Czylwik, first and second conventional components are computed for each antenna. The two first components from each antenna are added. The two second components from each antenna are added. The resulting sums are then treated conventionally as a first and second component. The option of weighting each component prior to combining across antenna according to a signal strength measure for each corresponding antenna is also disclosed in Czylwik. This later option is shown to perform better than any of the other proposals in the paper. Filtering of the resulting metric for time synchronisation is also disclosed.

Any discussion of documents, devices, acts or knowledge in this specification is included to explain the context of the invention. It should not be taken as an admission that any of the material forms a part of the prior art base or the common general knowledge in the relevant art in Australia, the United States of America or elsewhere on or before the priority date of the disclosure and claims herein.

SUMMARY OF INVENTION

It is an object of the present invention to overcome or mitigate at least one of the disadvantages of related art systems.

In one form the present invention provides an iterative decoding circuit for a wireless multiuser communications receiver comprising:

a first signal processing means for receiving at least one received signal, said first signal processing means comprising at least two linear iterative filters such that:

the first linear iterative filter provides an estimate of a selected received signal to an estimated signal output and;

a second linear iterative filter provides estimates of at least one other received signal, delayed by one iteration cycle, to an input of said first linear iterative filter;

a second signal processing means for receiving the estimated signal output of the first linear iterative filter and providing a further received signal estimate to the input of the first signal processing means in a succeeding iteration cycle of the decoding circuit.

In another form the present invention provides a method, apparatus and system of communicating in a multiple access network by iteratively receiving multi user signals comprising:

determining a first set of signal estimates for the multi user signals based on linear channel constraints;

determining a second set of signal estimates based on non-linear channel constraints and the first set of signal estimates;

providing the second set of signal estimates as input to the step of determining the first set of signal estimates;

repeating the above steps at least once.

In a further form the present invention provides an iterative receiver for receiving multi user signals comprising:

a first signal processing component for determining a first set of signal estimates for the multi user signals based on linear channel constraints;

a second signal processing component for receiving the first set of signal estimates and determining a second set of signal estimates based on non-linear channel constraints;

wherein the signal processing components are operatively connected so as to provide the second set of signal estimates as input to the first signal processing component in a succeeding iteration cycle.

In yet another form the present invention provides an iterative signal processing arrangement having:

one or more pairs of first and second signal processing components, the pairs of components being in iterative configuration, each of the first signal processing components having as input one or more received signals dependent upon one or more transmitted signals, wherein for each said signal processing component pair the output of said first signal processing component is an estimate of a characteristic of a selected transmitted signal based on the current and one or more previous input signals received by said first signal processing component, which is input to said corresponding second signal processing component that provides a further estimate of said selected transmitted signal to the output of said second signal processing component, the outputs of all said second signal processing components of respective pairs are input to each said first signal processing components of all said pairs in a succeeding iteration cycle In still another form the present invention provides a method, apparatus and system of communicating in a multiple access network by iteratively receiving OFDM packets comprising:

a) sample a receiver input signal;

b) add the input signal with one of a plurality of prior stored received packet sample estimates to determine a packet sample hypothesis;

c) determine an information bit estimate from the sample hypothesis for storage in an information bit estimates list;

d) determine an updated received packet sample estimate from the sample hypothesis for updating the plurality of prior stored estimates;

e) subtract the updated sample estimate from the sample hypothesis to determine a noise hypothesis and provide the noise hypothesis as the receiver input signal;

f) repeat steps a) to e) until at least one or more complete packets are accumulated in the information bit estimates list.

In yet another form the present invention provides a method, apparatus and system of communicating in a multiple access network by iteratively providing a sample estimates list in an OFDM receiver comprising:

a) sample a receiver input signal;

b) determine a packet sample estimate from the sampled receiver input signal;

c) store the packet sample estimate;

d) determine a packet sample hypothesis by adding the receiver input with a selected previously stored packet sample estimate;

e) determine an updated packet sample estimate by decoding and re-transmission modelling the packet sample hypothesis;

f) update the selected previously stored packet sample estimate with the updated packet sample estimate.

In still another form the present invention provides a method, apparatus and system of communicating in a multiple access network by iteratively providing a packet information bit estimates list in an OFDM receiver comprising:

a) determine a packet sample hypothesis by adding a receiver input with a selected previously stored packet sample estimate;

b) determine an information bit estimate by decoding the packet sample hypothesis with one or more of a hard decoding technique and a soft decoding technique c) storing the information bit estimate with one or more previously determined information bit estimates;

d) repeating steps a) to c) until a complete packet is accumulated.

In yet another form the present invention provides a method, apparatus and system of communicating in a multiple access network including determining a hybrid OFDM received packet sample estimate comprising:

multiplexing a time domain channel application received sample estimate with a frequency domain channel application received sample estimate, such that the multiplexed time domain sample estimate is mapped to correspond to one or more of:

an OFDM signal cyclic prefix;

an OFDM tail portion, and;

an OFDM guard period, and wherein the multiplexed frequency domain sample estimate is mapped to correspond to one or more of:

an OFDM signal preamble and;

an OFDM payload data symbol.

In another form the present invention provides a method, apparatus and system of communicating in an OFDM multiple access network comprising:

performing multi-user interference cancelling which comprises adapting a single pass OFDM receiver to iteratively receive signals at the sampling level so as to allow the receiver to differentiate a desired packet from an observation of an interference signal at the receiver input.

In yet another form the present invention provides a method, apparatus and system of communicating in a multiple access communication network by synchronizing packets arriving at a receiver comprising:

receiving a packet input signal;

determining a correlation signal corresponding to the packet input signal;

processing the input and correlation signals such that at least one of the input signal and the correlation signal are filtered;

determining a decision statistic by combining a power component of the processed correlation signal with a power component of the processed input signal;

nominate a point in time given by a predetermined threshold condition of the decision statistic as a received packet arrival time.

In yet another form the present invention provides a method, apparatus and system of communicating by tracking time varying channels in a multiple access packet based communication network comprising:

a) initializing a channel estimate reference based on an initial channel estimate in a received packet preamble;

b) updating the channel estimate reference based on a packet data symbol channel estimate in a coded portion of the current and all prior received data symbols;

c) repeating step b) at the arrival of subsequent packet data symbols.

In yet another form the present invention provides a method, apparatus and system of communicating by estimating time varying channel impairments in a multiple access packet based communication network, where channel impairments comprise channel variation, signal frequency offset and signal time offset, comprising:

a) initializing a set of channel impairment estimates based on initial pilot and preamble symbols included in a received packet;

b) performing a decoder operation which comprises processing the set of channel impairment estimates and the received packet to determine a set of transmit symbol estimates;

c) updating the set of channel impairment estimates with the determined set of symbol estimates and received packet;

d) repeating steps b) and c).

In still another form the present invention provides a method, apparatus and system of communicating in a multiple access network by time varying channel estimation in a receiver for receiving transmitted packets, comprising:

a) estimating a frequency offset based on information included in a received packet preamble;

b) correcting a received signal using the estimated frequency offset;

c) determining a channel estimate using information included in the received packet preamble;

d) transforming a sample sequence of the received signal into the frequency domain such that the sample sequence includes OFDM symbols and intervening cyclic prefixes;

e) performing a decoding operation which comprises processing the determined channel estimate and received packet;

f) generating a transmission sample sequence using the decoding results and information in the received packet preamble;

g) transforming the transmission sample sequence into the frequency domain;

h) updating the determined channel estimate by combining the received sample sequence and the transmission sample sequence in the frequency domain;

i) repeating steps e) to h).

In a preferred embodiment, the combining operation of step h), which updates the determined channel estimate, is performed by dividing the received sample sequence and the transmission sample sequence in the frequency domain.

In a further form the present invention provides a method, apparatus and system of communicating in a multiple access network by time varying channel estimation in a receiver for receiving transmitted packets, where the receiver retrieves OFDM symbols from a received signal and transforms the retrieved symbols to the frequency domain, comprising:

a) determine a matrix of training symbols comprised of symbol estimates derived from a decoder;

b) determine a matrix of frequency domain received OFDM symbols;

c) determine an intermediate channel estimate matrix by multiplying the OFDM symbol matrix by the conjugate of the training symbol matrix;

d) determine an intermediate matrix of training weights comprising the absolute value of the training symbol matrix;

e) perform a smoothing operation on both intermediate matrices comprising 2 dimensional filtering;

f) determine the channel estimate by dividing the smoothed channel estimate matrix with the smoothed training weight matrix.

In embodiments of the invention, the step d) determining an intermediate matrix of training weights may comprise other functions such as, for example, (absolute value of the training symbol matrix)$^2$.

In still another form the present invention provides a method, apparatus and system of communicating in a multiple access network by estimating offsets in a receiver for receiving transmitted packets, comprising:

a) determine a matrix of received OFDM symbols;

b) determine a matrix of conjugated data symbols wherein the data symbols comprise one or more of preamble, training and estimated symbols;

c) determine a 2 dimensional Fourier transform matrix comprised of the received symbol matrix multiplied with the conjugated symbol matrix;

d) filter the Fourier transform matrix;

e) determine time and frequency offsets by locating peak power occurrences within the filtered Fourier transform.

In a particular embodiment, the above steps a) to e) for estimating offsets may be used effectively as a means of channel estimation. For example, in the above described form of the invention which provides communication by estimating time varying channel impairments, the step c) of updating the set of channel impairment estimates with the determined set of symbol estimates and received packet may comprise the above steps a) to e) for estimating offsets.

In a further embodiment, the above method may be used as the channel estimator as required herein, in as much as updating the set of channel estimates with the determined set of symbol estimates.

In yet a further form the present invention provides a method, apparatus and system of communicating in a multiple access packet communication network by synchronizing a received signal in a multi antenna receiver comprising:

correlating a received signal observation at each of a plurality of antennae with a known signal preamble to provide a received signal sequence;

determine a power signal of each received signal sequence;

combine the determined power signals in accordance with a time averaged weighting based on estimated antenna signal strength for each antenna;

determine a time of arrival for the received signal in accordance with a predetermined threshold condition.

In embodiments of the present invention there is provided a computer program product comprising:

a computer usable medium having computer readable program code and computer readable system code embodied on said medium for communicating in a multiple access communication network, said computer program product comprising:

computer readable code within said computer usable medium for performing the method steps as disclosed herein.

Other aspects and preferred aspects are disclosed in the specification and/or defined in the appended claims, forming a part of the description of the invention.

The present invention provides an improved or enhanced wireless link between two communicating devices, for example, an IEEE 802.11a Access Point to an IEEE 802.11a Station or between two nodes in a wireless mesh. The present invention leads to enhanced key performance indicators for point to point links, namely, range, power, data rate and reliability. This is achieved by advanced signal processing techniques in the following areas to improve performance Decoding
Synchronisation
Equalisation
Channel Estimation
Full Exploitation of Multiple Receiver Antennae.

As would be understood by the person skilled in the art, in addition, techniques that exploit multiple antennas for transmission may be employed to provide electronically generated directional antennas in an adaptive manner. The following advantages stem from the present invention.

Spatial rejection of interference,
Significantly increased receiver sensitivity,
Significantly increased robustness to fading, and
Self configuration of antenna patterns Spatial rejection of interference effectively ignores or rejects signals that are not emanating from the same location as the current or point of interest source. Rejecting these signals increases the probability that a signal may be received without errors thus increasing the reliability of the link and therefore the throughput to lower retransmissions and dropped packets. Interferers have a spatial signature as measured at the receive antenna that is substantially determined by their position. However, it is possible that transmitters that are not collocated could produce a similar spatial signature and it is also possible that collocated transmitters could produce different spatial signatures.

Significantly, increasing the receiver sensitivity means that the receiver may operate a lower SNR (Signal-to-Noise-Ratio) point which produces many benefits. Since the received power at which the signal may be successfully decoded has been reduced, the path loss may be increased by increasing the distance between the receiver and transmitter thereby increasing the range. Alternatively, the present invention allows the transmit power to be decreased and still a link may be maintained. Increasing the receiver sensitivity also means that less power is required per bit and accordingly, it may be possible to transmit a higher number of information bits per constellation symbol. This increases the data rate.

Robustness to fading provided by the inventive techniques disclosed herein may decrease the amount of packet errors due to extreme radio channel variations or fades. By increasing robustness, a more reliable link may be created ensuring a better user experience and increased throughput through less re-transmissions and fewer dropped packets.

The use of multiple antennas for transmit and receive functions allows the rejection of interference from outside the direction of interest. This functionality is adaptive so no hands-on antenna orientation is required at install-time or during the life of the installations.

By way of example, indicative performance measures of a sample communications link are given with and without the use of the Point-to-Point technology of the present invention.

| | Typical of Related Art | Present Invention |
|---|---|---|
| Range | 300 m | 1 km |
| Required $T_x$ Power | 1.0 W | 0.1 W |
| Maximum Data Rate | 500 Kbps | 5 Mbps |

The present invention also provides improved channel tracking capabilities. Channel tracking technology refers to the adaptation of the receiver, when the channel changes rapidly over the duration of a single packet. Typically, the channel estimate that is used to decode a received packet is determined from known sequences at the start of a packet. This estimate may be used to decode the whole packet. However, if the relative speed between the transmitter and receiver is great enough, the channel experienced at the beginning of the packet is substantially different from that at the end of a packet rendering the channel estimate incorrect for the end of the packet resulting in decoding errors. There are other processes that manifest themselves as the radio channel changing over the packet. These include mismatches between the Transmit and Receive Radio processing resulting in residual frequency offsets and misalignments in the time and frequency synchronisation. It is difficult to build transmit and receive radio devices that match perfectly.

The advanced signal processing techniques of the present invention allows a receiver circuit to build a progressive Channel Estimate that tracks the changes in the channel over the duration of a packet. The benefit of applying such Channel Tracking technology is the ability to communicate under high mobility conditions and under larger mismatches between the transmit and receive radio processing. By way of example, typical performance measures of a sample communications link are given with and without the use of the Channel Tracking technology.

| | Typical of Related Art | Present Invention |
|---|---|---|
| Maximum Mobility | 40 km/hr | 400 km/hr |

The present invention also provides interference cancelling allowing the removal of same standard interference from a signal. The term "same standard" refers to transmissions of similar packet structures from other users in a multiuser system, or multipath transmissions (reflections) from the same transmitter, or multiple transmit antenna in the case of a device equipped with multiple transmit antenna. In all wireless communications systems, multiple active transmitters share the wireless medium. This sharing may be done in a coordinated attempt in infrastructure networks by dividing the wireless medium into time and frequency slots or in an uncoordinated attempt in an-hoc networks by all active transmitters contesting for the right to use the medium. Both schemes limit the use of the medium to a well defined frequency and time where only one user may transmit. Packet collisions occur when two transmitters inadvertently choose to use the same frequency at the same time. The Interference Cancelling technology includes advance signal processing techniques that benefit the following areas Acquisition
Interference Mitigation
Range
Network Throughput
Reduced Control Overhead Further benefits of the Interference Cancellation technologies of the present invention resolve collisions between two or more transmitters from the same standard transmitting at the same time on the same frequency. This has numerous advantages. Firstly, when collisions occur, all transmitted packets are received correctly increasing throughput and reliability by decreasing retransmissions and dropping packets. Secondly, by removing the requirement that only one transmitter may use a given frequency at a given time the amount of traffic that can be carried on the medium may be increased. Moreover, this may give greater flexibility in infrastructure design such as frequency planning and in the case of co-located competing networks such as two IEEE 802.11 networks from separate companies in adjoining offices.

In the case where the desired user and interfering users transmit according to different standards, the interference cancellation structure may employ a receiver and re-transmitter for all relevant standards. The receiver is then able to create hypotheses of the interfering signals thereby enabling interference cancellation.

Collisions may be resolved in the Physical Layer in accordance with embodiments of the present invention. The resulting reduction in network signaling overhead multiplies the benefits over and above the resolution of the two colliding packets. Typical quantitative measures are a doubling of network throughput and several orders of magnitude reduction in packet loss rate as follows:

| | Typical of Related Art | Present Invention |
|---|---|---|
| Throughput | 10 Mbps | 20 Mbps |

The multi-hop technology of embodiments of the present invention allows selected (and possibly all) wireless devices to act as routers, forwarding packets from one device to another in a communication network. This means that though two devices may not receive each others signals, if there is a set of intermediate devices that may be linked to form a radio path between them, then they may communicate to each other by passing their message through that intermediate set.

Depending on the particular network dynamics, the multi-hop technology may employ dynamic route determination techniques to build and maintain the required routing tables. Multi-hop networks provide many benefits in terms of flexibility, reliability and cost of infrastructure.

Flexibility is achieved through a self forming network that requires minimal planning. The only requirement is that no device may be isolated, in a radio range sense, from the core network. All configurations meeting this criterion may be possible.

If multiple paths between devices exist in the network, dynamic route determination may select a new route when the current route is blocked or congestion is best avoided. Therefore if a device was to go offline, the network may rearrange its routing tables to exclude that device from all routes and find a new path through the network thus creating a robust, self healing (and therefore more reliable network). Dynamic route determination continuously adapts to network configuration changes allowing for mobile network nodes.

Multi-hop networks in accordance with embodiments of the present invention offer a simple solution to provide a high bandwidth link over a wide area. Due to easy flexible installations, low infrastructure costs and a high rate, reliable link, multi-hop networks generally offer excellent return on investment.

Four areas of application in the communications field which best utilize the benefits of the technologies of embodiments of the present invention have been identified by the inventor as Mobile Multi-hop Radio Networks
Fixed Multi-hop Radio Networks
IEEE 802.11a Access Point Chipsets
802.16 Base Stations
OFDM Baseband Receiver Co-processor The following describes each of the above identified applications in turn. Other applications may also benefit from these technologies of embodiments of the present invention.

Firstly, a Mobile Multi-hop Radio Network requires effective real-time communication to networks of moving entities. This concept provides cost-effective bi-directional high bandwidth communication both between the mobile entities and between fixed networks and the mobile entities. Wireless Routers are placed where service is required with regular connections to a wideband backbone network. A fixed network may be used to connect to other networks such as the internet or other private networks. Other than access to power and a physical mounting point no other infrastructure is required for each wireless router. The wireless routers may be fixed or mobile. The routers adapt to their environment in terms of link quality using, for example, data communications methods as would be understood by the person skilled in the art. Embodiments of the present invention provide a competitive advantage relative to other Multi-hop Radio Networks in that the improved mobility and range, as noted above, leading to a more efficient network is provided. Relative to related art Private Communications Networks, embodiments of the present invention provide significant improvements in Data Rate, Range, Mobility and cost of Network as noted above.

Secondly, a Fixed Multi-hop Radio Networks is provided by installing Wireless Routers at fixed user locations with links available to one or more wideband backbone connections. The only requirement is that all routers must be able to form a link (direct or hopped) back to a backbone connection. There is no need for expensive base station configurations and ultimate range is not limited by signal strength. The Fixed Multi-hop radio Network forms a flexible, low infrastructure cost solution in providing a high bandwidth connection to a Wide Area Network that is reliable, easily managed and self healing.

Furthermore, the present invention enables all decoder outcomes to be employed (decoder outcomes are stored across all iterations and able to be combined) in the receiver filter structure providing improved estimate determination. The number of users that may be supported is greatly increased. Particularly advantageous, for example, in OFDM systems the present invention does not require prohibitively large matrices to be inverted in forming estimates. Receiver performance is superior to that of the related art due to the quality of the feedback symbol provided by including decoding in the iteration loop. Embodiments of the present invention are based on interference cancellation where previous estimates of the multi user received signals are subtracted from the received signal to cancel the interference they cause. Accordingly, these embodiments do not suffer the disadvantages and complexities of using tree search methodologies for multiuser signals which would necessitate exploring many paths through a given tree. The present invention advantageously enables decoding of each user's signal according to their Forward Error Correction encoding. This use of strong error control code structure provides for significantly improved symbol estimates, resulting in superior interference estimates. This in turn allows support for significantly higher numbers of users. Embodiments of the present invention do not require synchronised users to enable improved multi user reception. Embodiments of the present invention advantageously use decoder outcomes as training symbols rather than only using demodulator outcomes. Advantageously, receiver coefficients for beamforming may be determined without transmitter interaction. Also the use of decoder outcomes to improve channel estimates allows accurate estimation of the required beamforming coefficients. In accordance with embodiments of the present invention, smoothing of channel estimate taps is performed in the frequency domain as well as the time domain. Further to this, embodiments of the present invention allow decoding of symbols more than once as a channel estimate corresponding to its interval is improved resulting in increased receiver sensitivity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further disclosure, improvements, advantages, features and aspects of the present invention may be better understood by those skilled in the relevant art by reference to the following description of preferred embodiments taken in conjunction with the accompanying drawings, which are given by way of illustration only, and thus are not limiting to the scope of the present invention, and in which.

DETAILED DESCRIPTION

System Overview

Figure 19A:
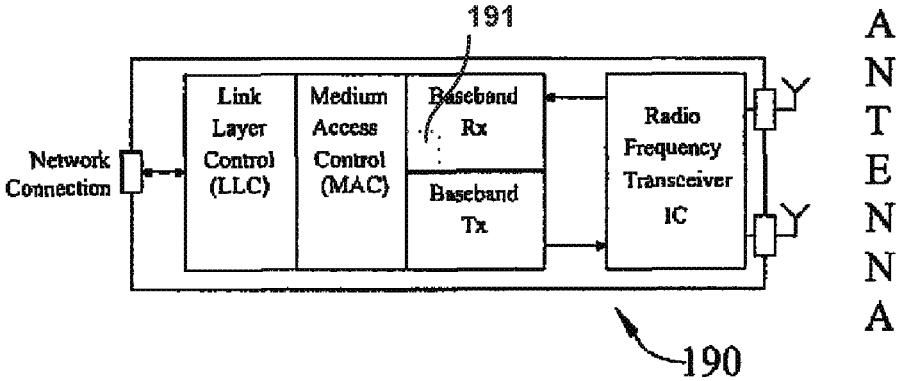
FIGS. 19a and 19b show a wireless modem incorporating a baseband receiver processor in accordance with preferred embodiments of the present invention.
Figure 19B:
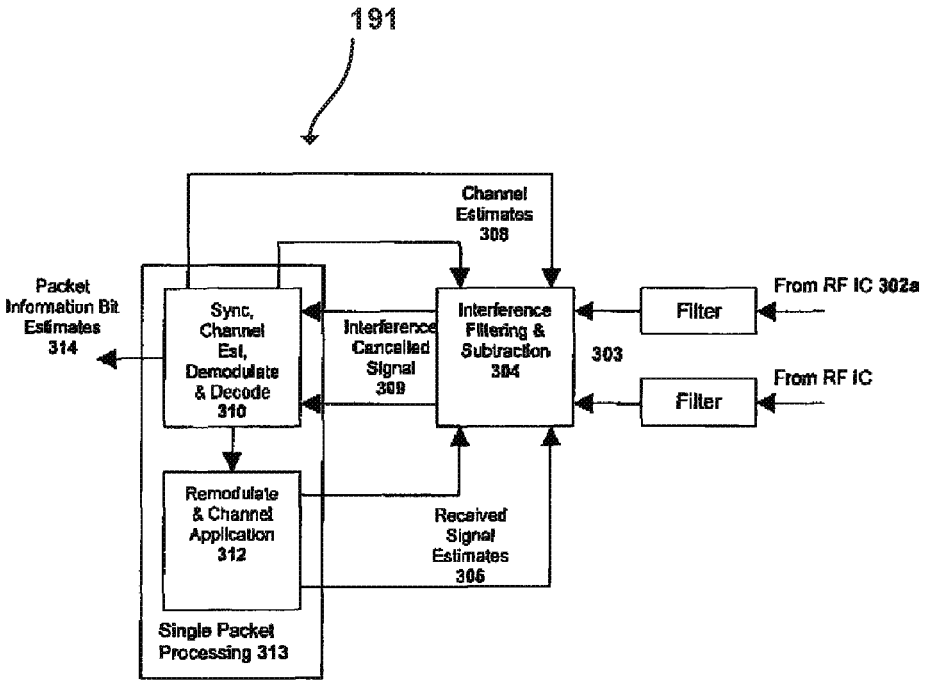

In wireless networks a signal received at a network device comprises components from all active transmitters. These components, along with noise, add together resulting in the received signal. In some cases, only one of these components, corresponding to a specific transmitter, is of interest. In other cases, such as a reception at a network access point, several of the received components are of interest. In either case the presence of the other signal components in the received signal inhibits the accurate estimation of any given transmitted signal of interest. In accordance with embodiments of the present invention a system and methods and apparatus for processing a received signal comprising one or more received signal components from different transmitters is disclosed herein. The processing typically resides in *a processor which may be* the baseband receiver [processing] *processor 191* of a wireless transceiver 190 as illustrated in FIGS. 19a and 19b. The Radio Frequency Transceiver Integrated Circuit (IC) is an analogue device that interfaces between the digital signal processing components LLC, MAC, Rx, TX, and the antenna system of the transceiver. In receive mode IC amplifies and down converts the received signal suitable for driving analogue to digital converters. In transmit mode it up converts and amplifies the signal for excitation of the antenna.

The baseband receiver *processor 191* is responsible for determining the existence of any packets and then to recover transmitted information estimates from the received signal if packet(s) are deemed to exist.

A canonical baseband receiver processor Rx is shown in FIG. 19b. The received signals for each antenna are supplied as input by the Radio Frequency Circuit IC. These signals are then filtered 302 by filters 302a, 302b to remove any out of band interference. The filtered signals 303 are then combined with the current Received Signal Estimates 306, implementing an interference cancellation function 304. Ideally, the interference cancellation module 304 removes the signal components in the received signal pertaining to all packets except for the packet of interest. The packet of interest is then decoded by feeding the Interference Cancelled output 309 to a Single Packet Processor 313.

The Single Packet Processor 313 takes a Multiantenna received signal as delivered by the Interference Cancellation module 304 and produces an estimate of the transmitted information bits 314 and an estimate of the received symbols 306 for the packet of interest. These symbols, along with the channel estimates for the packet of interest, are then fed back to the interference cancellation module 304. In some cases it is preferred to send back only the transmitted symbol estimates to the interference cancellation module 304.

The Single Packet Processor 313 may contain advanced or conventional single packet techniques. The multiuser interference rejection performance of the receiver will be better if the Single Packet Processor is of high quality. Techniques pertaining to synchronisation and channel estimation are key to the performance of the Single Packet Processor 313.

Techniques that improve the robustness of the synchronisation and channel estimation employed in decoder 310 are described herein. The synchronisation uses all antenna signals in its operation. The channel estimation makes use of the decoder outcomes to improve the channel estimation accuracy.

New packets are found by a searcher in the interference cancellation module 304. The searcher investigates an intermediate signal generated in the module 304. This intermediate signal is the received signal minus the estimated received signal for all currently detected packets and is referred to as a noise hypothesis since in ideal conditions all transmitter components are removed from the received signal leaving behind only the random noise.

In applications sensitive to latency the feedback loops, both inside 310 for decoder outcome assisted channel estimation, and between 304, 310 and 312 for multi packet interference cancellation may be executed at a rate higher than the packet rate. In OFDM based systems the preferred choice for the loop rates is the OFDM symbol rate with decoding and interference cancellation occurring at the OFDM symbol rate.

In applications where packet based decoding and interference cancellation may be performed at the packet rate additional packet-based techniques for the Single Packet Processor 313 are disclosed. These techniques leverage the extra signal processing gain available when considering long sequences of symbols.

In either case, lists of current estimates of the quantities passed between the Interference Canceller 304 and the Single Packet Processor 313 are required. A controller determining which packet is to be updated may also be utilised.

With reference to FIGS. 4 to 9, a first embodiment stems from the general realization that over a number of iterations using linear filters in a multiuser receiver, each iteration provides new information and, as the filter structure converges, the output of the decoders also converges and eventually becomes completely correlated. The linear filters of the multiuser decoding circuit means may be structured in accordance with at least one predetermined recursive expression.

An innovation in the filter design of a first embodiment disclosed herein is to exploit the fact that information provided by the decoders is initially only marginally correlated over iterations, i.e. in the first few iterations, each iteration provides new information. As the structure converges, the output of the decoders also converges and eventually becomes completely correlated.

The disclosed filter design is based on a technique to use all available information from all previous iterations. This implies that the filter grows linearly in size by a factor equal to the number of users. This is clearly impractical. Thus, the disclosed filter design makes it possible to use all the available information through recursive feedback of the filter output over iterations, without requiring a growing filter. The size of the filter remains the same. In order to achieve this, the filters in the structure may be designed according to the recursive expressions derived herein.

Related structures, having lower complexity implementations, are obtained by modifying the specific filters used in the structure. The general recursive structure, however, is still fundamental for such modified filters. In these cases, the individual filters are designed according to appropriately different strategies using the principles disclosed herein.

The recursive filtering structure for iterative signal processing disclosed herein is not limited to multiuser detection, but may also be directly applied within systems and functionalities of the same structure. Examples of such applications are iterative equalisation, iterative joint channel estimation and detection/decoding, iterative space-time processing, and iterative demodulation.

Figure 1:
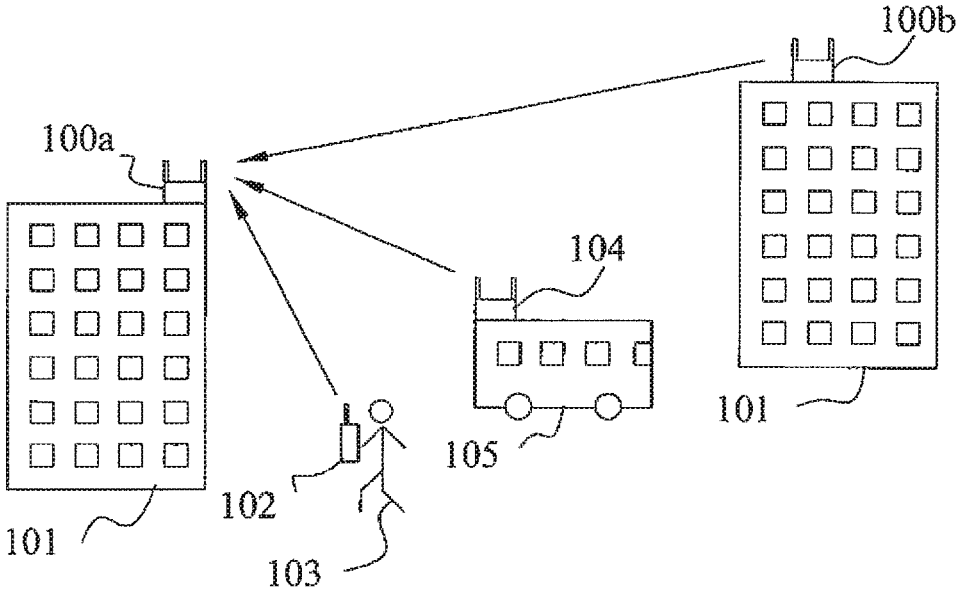
Figure 1 (Prior Art)
FIG. 1 illustrates a related art multiple access wireless communication system.
Figure 2:
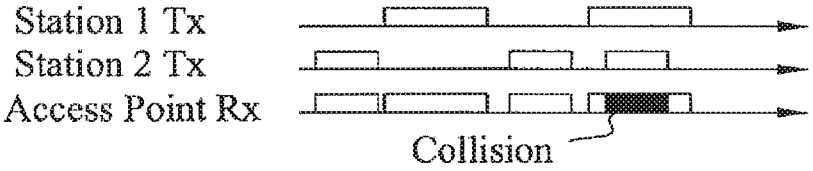
Figure 2 (Related Art)
FIG. 2 illustrates an example of a MAC failure in a related wireless communication system involving an access collision.
Figure 3:
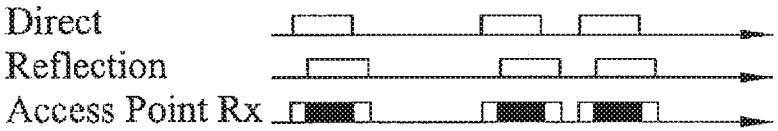
Figure 3 (Related Art)
FIG. 3 depicts self interference in WLAN network of a related art wireless communication system.
Figure 10:
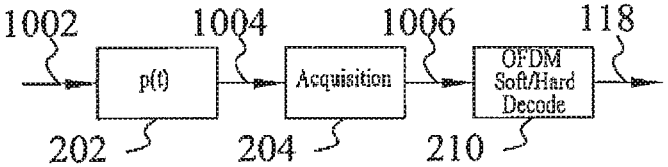
Figure 10 (Related Art)
FIG. 10 shows a typical related art single pass OFDM receiver high level structure.
Figure 4:
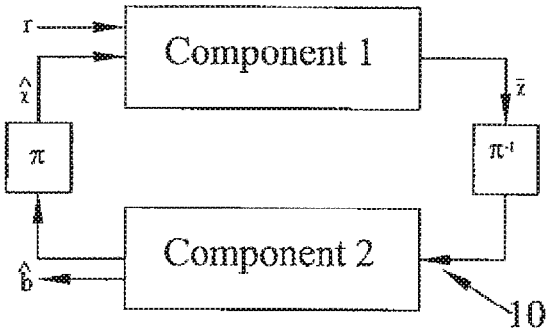
FIG. 4 depicts a generic iterative receiver structure in accordance with a first embodiment.

In a broad aspect of the first embodiment, an iterative signal processing arrangement shown generally in FIG. 4 as 10 having one or more pairs of first and second signal processing components 1, 2, the pairs of components being in iterative configuration, each of the first signal processing components having as input one or more received signals dependent upon one or more transmitted signals, wherein for each said signal processing component pair the output of said first signal processing component 1 is an estimate of a characteristic of a selected transmitted signal based on the current and one or more previous signals received by said first signal processing component 1, which is input to said corresponding second signal processing component 2 that provides a further estimate of said selected transmitted signal to the output of said second signal processing component 2, the outputs of all said second signal processing components of respective pairs are input to each said first signal processing components of all said pairs in a succeeding iteration cycle.

In a further aspect of the first embodiment, the iterative signal processing arrangement 10 according to that described above wherein said first signal processing component 1 comprises at least two linear iterative filters wherein a first of said linear iterative filters outputs an estimate of a selected-characteristic of a selected one or said transmitted signals to said second signal processing component 2, and a second of said iterative filters having the same inputs as said first linear iterative filter provides an estimate of a characteristic of a selected of one or more transmitted signals and then delays by one iteration cycle said estimate and outputs said delayed estimate to an input of said first linear iterative filter.

This first embodiment is intended for application to any communication system described by a generic linear channel model. The received signal at the input to the receiver is described by a weighted sum of the transmitted signals plus noise. The set of weighting factors represents a set of linear constraints imposed on the transmitted signals. Other constraints could possibly have been imposed on the signals. These other constraints are independent of the linear constraints imposed by the linear channel.

The optimal receiver structure finds the estimates of the transmitted signals, subject to all the imposed constraints. This approach is prohibitively complex for most practical cases of interest. As an alternative, a generic iterative receiver structure comprises of two separate components (see FIG. 4). The first component 1 finds the optimal estimates, only subject to the linear channel constraints, ignoring all other constraints. Only preferably these estimates are shuffled by reordering according to a pre-determined order (de-interleaved) and used as inputs to the second component 2 which finds the optimal estimates subject only to all the other constraints, ignoring the linear channel constraints. These estimates are in turn, preferably shuffled back into the original order (interleaved), undoing the pre-determined reordering, and used as inputs to the first component 1 in the succeeding iteration cycle.

The optimal design of the first component 1, enforcing the linear channel constraints is often also prohibitively complex. To limit complexity, the component design itself can be constrained to be linear, leading to a linear signal processing component. The design of this linear signal processing component, given selected inputs, is the main subject of this disclosure with respect to the first embodiment. For the following description, the first embodiment lies in the linear signal processing component, or signal processing component 1, corresponding to component 1 in FIG. 4. The remaining part of FIG. 4 is referred to as signal processing component 2.

The function of the linear signal processing component 1 is to separate a selected transmitted signal from other "interfering" transmitted signals, based on the received signal which is a weighted sum of all transmitted signal as described above.

The input to the linear signal processing component 1 are one or more received signals and one or more estimates of the transmitted signals, provided by signal processing component 2. The output of the linear signal processing component 1 is an estimate of the selected transmitted signal.

The linear signal processing component 1 comprises two linear filters. The first filter provides as output estimates of the selected transmitted signal based on inputs of one or more of the input signals to the linear signal processing component, the output of this first filter delayed by one processing time period of the iterative cycle, and the output of the second filter delayed by one processing time period of the iterative cycle.

The second filter provides as output estimates of one or more of the other transmitted signals (interfering with the selected transmitted signal) based on inputs of one or more of the input signals to the linear signal processing component, and the output of the second filter delayed by one processing time period of the iterative cycle.

The output of the first filter is the output of the linear signal processing component.

Specific embodiments of the first embodiment will now be described in some further detail with reference to and as illustrated in the accompanying figures. These embodiments are illustrative, and not meant to be restrictive of the scope of the embodiment. Suggestions and descriptions of other embodiments may be included but they may not be illustrated in the accompanying figures or alternatively features of the embodiment may be shown in the figures but not described in the specification.

This embodiment is described using linear multiuser estimators (MUEs) suitable for use as part of an iterative multiuser decoder. A specific application of the technique in the field of turbo-decoding in a transmission system for coded CDMA is provided. However, as stated previously the structure of the filter and the principles revealed are useful in many other areas of the communications field. Thus the embodiment provided should not be considered as limiting in any way.

The specification includes theoretical considerations expressed in an appropriately precise fashion and uses mathematical analysis to prove the correctness of the approach using assumptions as required. Not all proofs of theorems used are provided herein. A disclosure such as that contained herein has directed correlation to practical devices and configurations of filter elements of performing the functions described. Furthermore the disclosure provided herein would be readily understood by those skilled in the art. The disclosure is such that a person skilled in the art can readily translate the theoretical configurations of elements disclosed herein into a variety of devices to solve problems or improve the performance of devices and algorithm in a variety of application areas some of which have been described previously and that will be described herein.

This embodiment is intended for application to any communication system described by a generic linear channel model. The received signal at the input to the receiver is described by a weighted sum of the transmitted signals plus noise. There could be multiple received observables pertaining to the same symbol internal, ie, the received signal can be a vector of received observables, $$r = \sum_{i=1}^{K} s_i x_i + n \tag{1}$$

where a total K signals are transmitted, $s_k$ is the weighting factors for signal $x_k$ and n is a noise vector.

Here, the set of weighting factors, $s_1, s_2, \ldots, s_K$ represents a set of linear constraints imposed on the transmitted signals. Other constraints could possibly have been imposed on the signals $x_1, x_2, \ldots, x_K$ such as error control encoding, channel fading etc. These other constraints are independent from the linear constraints imposed by the linear channel.

The optimal receiver structure finds the estimates of the transmitted signals, subject to all the imposed constraints. This approach is prohibitively complex for most practical cases of interest. As an alternative, a generic iterative receiver structure comprises of two separate components (see FIG. 4). The first component 1 finds the optimal estimates, only subject to the linear channel constraints, ignoring all other constraints. These estimates are inputs to the second component 2 which finds the optimal estimates subject only to all the other constraints, ignoring the linear channel constraints. These estimates are in turn, provided as inputs to the first component 1 in the following iteration cycle.

The optimal design of the first component 1, enforcing the linear channel constraints is often also prohibitively complex. To limit complexity, the component 1 design itself can be constrained to be linear, leading to a linear filter. The design of this linear filter, given selected inputs to the filter, is disclosed herein. The function of the filter is to separate a selected signal from other "interfering" signals, based on the received signal which is a weighted sum of all transmitted signal as described in (1). All the references provided in this specification are incorporated herein by reference and for all purposes. An innovation in the filter design disclosed herein is to exploit the fact that information provided by the decoders is initially only marginally correlated over iterations, i.e., in the first few iterations, each iteration provides new information. The disclosed filter design is based on a technique to use all available information from all previous iterations.

This implies that the filter grows linearly in size by a factor equal to the number of users. This is clearly impractical. Thus, the disclosed filter design makes it possible to use all the available information through recursive feedback of the filter output over iterations, without requiring a growing filter. The size of the filter remains the same. The filter design is based on two linear iterative filters, where the first linear filter provides an estimate of the desired signal based on the received signal, the most current estimates of all user signals from signal processing component 2, and the output of the second linear filter which is a vector of estimates of all user signals based on all previous inputs to signal processing component 1. The two linear filters are shown explicitly in FIG. 8.

The linear iterative filters may appropriately be designed based on the linear minimum mean squared error criterion, according to the recursive expressions derived therein.

This embodiment applies to any system described by such a generic linear channel model, and where an iterative receiver as described above, is to be applied. Examples of such applications include (but are not limited to) the following:

- Decoding of coded transmission in a linear multiple access system.
- Decoding of coded transmission over an inter-symbol interference channel.
- Joint channel estimation and detection/decoding of coded transmission over unknown channels.
- Decoding of space-time coded transmission.
- Decoding of coded transmission with higher order modulation formats.

In the following, the design is demonstrated for multiuser decoding for a general linear multiple access system.

System Model in Multiuser Decoding Example

The basic principle behind turbo decoding is to decode independently with respect to the various constraints imposed on the received signal. The overall constraint is accommodated by iteratively passing extrinsic information between the individual decoders. For turbo codes, these constraints are the parallel concatenated codes. For turbo-equalisation they are the channel code and the memory of the inter-symbol interference channel. For multiuser decoding, there are constraints due to the multiple-access channel and due to the individual users' encoders.

In this embodiment, a theoretical framework for the derivation of linear multiuser estimators (MUEs) suitable for use as part of an iterative multiuser decoder is disclosed. We consider a two-input linear minimum mean squared error (LMMSE) estimator which inspires our main result, the derivation of a recursive Bayesian estimator. The proposed estimator yields estimates based on the received signal and all the successive outputs provided by the error control code decoders over all previous iterations. This approach is motivated by an observation that these estimates are loosely correlated during initial iterations.

Notation: $P^n$ is the space of probability n-vectors (length n non-negative vectors that sum to 1). For random vectors x and y, E[x] is the expectation, varx=E[x*x] and covx=<x, x>=E[xx*]. Likewise cov(x,y)=<x,y>=E[xy*].

Figure 5:
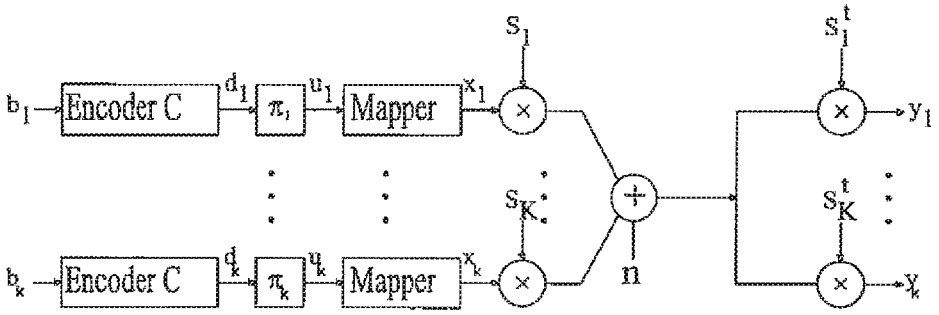
FIG. 5 depicts the transmission system model for coded CDMA.

We consider the K-use linear multiple-access system of FIG. 5. User k, k=1.2, . . . , K encodes its binary information sequence $b_k[l]$ using a rate R code C, to produce the coded binary sequence $d_k[l]$.

Consider transmission of 2L code bits per user. Each user independently permutes their encoded sequence with an interleaver $\pi_k$. Denote the sequence output from the interleaver of user k as $u_k[l]$, l=1, 2, . . . 2L. Pairs of interleaved code bits $u_k[l]$ are memorylessly mapped onto the quaternary phase-shift keyed (QPSK) signal constellation, $Q=\{\pm 1/\sqrt{2} \pm j/\sqrt{2}\}$, giving sequences of modulated code symbols $x_k[i]$, where i=1, 2, . . . , L is the symbol time index. We choose QPSK only for simplicity and note that different code constraints and symbol maps across users are possible in general.

At symbol time i, each user transmits $s_k[i]x_k[i]$, the multiplication of $x_k[i]$ with the real N-chip spreading sequence, $s_k[i]\varepsilon\{-1, 1\}^N$. We model the use of spreading sequences with period much longer than the data symbol duration by letting each element of $s_k[i]$ be independent and identical distributed over users and time. For conceptual ease only, users are symbol synchronised, transmit over an additive white Gaussian noise (AWGN) channel, and are received at the same power level. These assumptions however are not required. Write the chip-match filtered received vector $r[i]\varepsilon\square^N$ at symbol time i=1, 2, . . . , L as $$r[i]=s[i]\times x[i]+n[i] \tag{2}$$

where $S[i]=(s_i[i], s_2[i], \ldots, s_k[i])$, is a N×K matrix with the spreading sequence for user k as column k. The symbol □ represents the set of complex numbers. The vector $x[i]\varepsilon Q^K$ has elements $x_k[i]$ and the vector $n[i]\varepsilon\square^N$ is a sampled circularly symmetric i.i.d. Gaussian noise process, with $covn[i]=\sigma^2 I$. The symbol Q represents the set of possible modulated symbols, e.g. QPSK.

Henceforth, it is not required to identify specific symbol intervals and these indices will be omitted. For later use, we define $S_{\bar{k}}=(s_1, s_2, \ldots, s_{k-1}, s_{k+1}, \ldots, s_K)$ and $x_{\bar{k}}=(x_1, x_2, \ldots, x_{k-1}, x_{k+1}, \ldots, x_K)^t$ to indicate deletion of user k from S or x.

Recursive Filter from Multiuser Estimation

Figure 6:
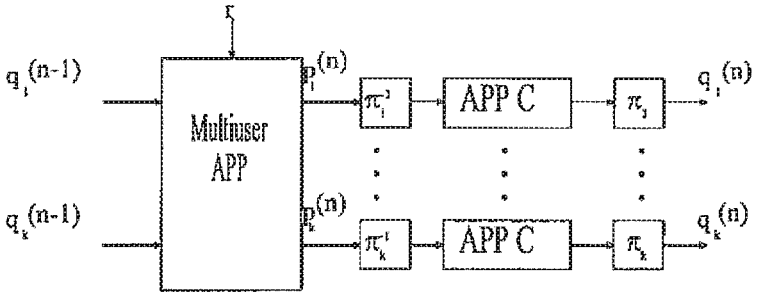
FIG. 6 depicts a canonical iterative multiuser decoder.

Application of the turbo-principle to the coded linear multiple-access system, where for each user, we treat the error control code as one constraint and the multiuser channel (2) as the other constraint, results in the canonical receiver structure of FIG. 6[1].

An iteration $n_1$, the multiuser APP takes an input r and the set of extrinsic probabilities $q_k^{(n-1)}$ from user k=1, 2, . . . , K calculated in the previous iteration n−1. $q_k^{(n-1)}[i]\varepsilon P^{|Q|}$ is the extrinsic probability distribution on the transmitted symbols $x_k[i]\varepsilon Q$ of user k. The set Q is the set of all possible modulated symbols at the transmitter. The multiuser APP calculates the updated extrinsic probability vector $p_k^{(n)}[i]$ for user k. After appropriate de-interleaving, the extrinsics $p_k^{(n)}$ are used as priors for independent APP decoding of the code C by each user, producing (after interleaving) the extrinsics $q_k^{(n)}$ which serve as priors for the subsequent iteration. The marginalisation in the multiuser APP requires summation over $|Q|^{K-1}$ terms. Many lower-complexity alternatives have been proposed while retaining the same basic architecture.

Figure 7:
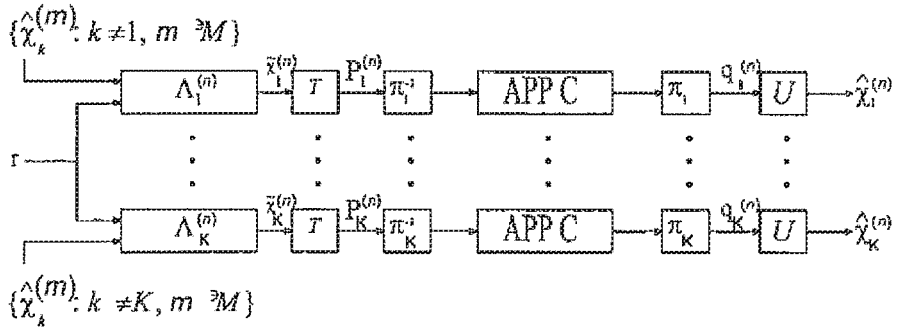
FIG. 7 depicts an iterative multiuser decoder with linear multiuser estimation in accordance with a first embodiment.
Figure 8:
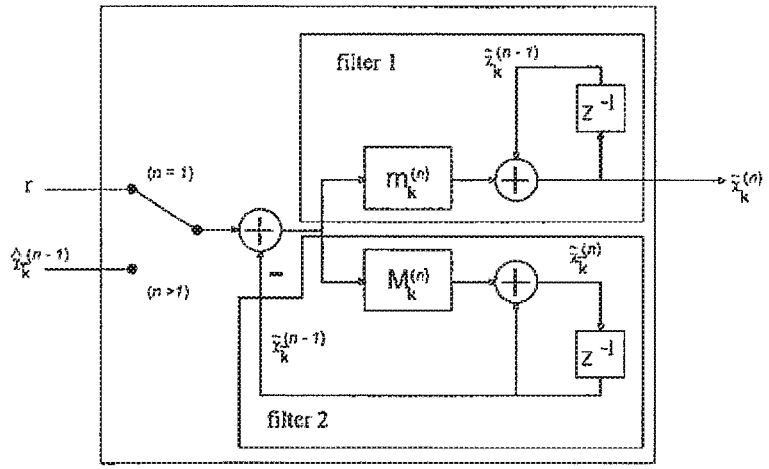
FIG. 8 depicts the recursive filter $\Lambda_k^{(n)}$ in accordance with a first embodiment for n=1 the input signal is r while for n≥ the input signal is $\hat{x}_k^{(n-1)}$.

Consider the receiver structure shown in FIG. 7. There is a bank of linear filters $\Lambda_k^{(n)}$, one for each user. The coefficients of these filter may be re-computed every iteration. For the first iteration, n=1, the input to $\Lambda_k^{(1)}$ is just r. For subsequent iterations n=2, 3, . . . , the input to the filter for user k is r and a set of signal estimates for all the other users from previous iterations, $\{\hat{x}_{k'}^{(m)}: k' \neq k, m \varepsilon M\}$, where $M \subseteq \{1, 2, \ldots, n-1\}$ is a set defining the memory order of the iteration. Typically in the literature, $M=\{n-1\}$, although recently $M=\{n-1, n-2\}$ has been considered [2].

The output of the filter $\Lambda_k^{(n)}$ is an updated sequence of estimates $\hat{x}_k^{(n)}$ of the corresponding code symbol for user k. These estimates are mapped from the signal space onto the probability vector space using a symbol-wise mapping $T: \square \rightarrow P^{|Q|}$. The resulting sequence of probability vectors $p_k^{(n)}$ are used as priors for individual APP decoding of the code C. These APP decoders can output either posterior or extrinsic probabilities $q_k^{(n)}$ (both approaches have been investigated in the literature). The sequence of probability vectors $q_k^{(n)}$ is in turn mapped back onto the signal space by a symbol-wise function $U: P^{|Q|} \rightarrow \square$. Typically, T calculates the vectors $p_k^{(n)}$ assuming that $\hat{x}_k^{(n)}$ is Gaussian distributed with known mean and variance, $\hat{x}_k^{(n)}: N(\tilde{\mu}_k^{(n)}, \tilde{\zeta}_k^{(n)})$. Likewise, a common choice for U is the conditional mean.

The following easily proved lemma provides a useful general framework for the derivation of filters $\Lambda_k^{(n)}$.

Lemma 1

Suppose that for a parameter x we have the vector observation $c=(a^t b^t)^t$, the concatenation of two vector observations a and b. The LSE estimate of x given c is $$\tilde{x}=\langle x,a\rangle \langle a,a\rangle^{-1}a+m(b-\langle b,a\rangle \langle a,a\rangle^{-1}a) \tag{3}$$

where $$m=(\langle x,b\rangle-\langle x,a\rangle\langle a,a\rangle^{-1}\langle a,b\rangle)(\langle b,b\rangle-\langle b,a\rangle\langle a,a\rangle^{-1}\langle a,b\rangle)^{-1}$$

We see that (3) can be written as $\tilde{x}=ga+m(Fa-b)$, where $$m=(\langle x,b\rangle-\langle x,a\rangle\langle a,a\rangle^{-1}\langle a,b\rangle)(\langle b,b\rangle-\langle b,a\rangle\langle a,a\rangle^{-1}\langle a,b\rangle)^{-1} \tag{4}$$

$$F=\langle b,a\rangle\langle a,a\rangle^{-1} \tag{5}$$

$$g=\langle x,a\rangle\langle a,a\rangle^{-1} \tag{6}$$

So far in the literature, linear filters $\Lambda_k^{(n)}$ for multiuser estimation in iterative decoding have been designed based on the received signal r and the most current code symbol estimates of the interfering users $\hat{x}_k^{(n)}$. After n iterations, we have however a sequence of such estimates available, namely $\{\hat{x}_k^{(1)}, \tilde{x}_k^{(2)}, \ldots \tilde{x}_k^{(n)}\}$ together with r. It has been observed that the estimates are not strongly correlated during the initial iterations [2].

Consider the following recursively defined version of observables as input to the filter $\Lambda_k^{(n)}$, $$c_k^{(n)} = \begin{cases} r & n = 1 \\ \begin{pmatrix} c_k^{(n-1)} \\ \hat{x}_k^{(n-1)} \end{pmatrix} & n = 2, 3, \ldots \end{cases} \tag{7}$$

Direct application of the LMMSE criterion results in $\Lambda_k^{(n)}=\langle x_k, c_k^{(n)}\rangle\langle c_k^{(n)}, c_k^{(n)}\rangle^{-1}$. It is clear however that $\Lambda_k^{(n)}$ grows in dimension with n which is impractical.

Inspired by recursive Bayesian estimation (RBE) [3], we can prove the following theorem that solves this dimensionality problem by giving a recursive form from $\Lambda_k^{(n)}$ (subject to certain constraints on the input signal).

Theorem 1

Make the following assumptions,

A1: The received signal r=Sx+n, is described according to (2) where n is circularly symmetric complex Gaussian with $\text{cov}n=\sigma^2 I$, and $\sigma^2$ and s are known.

A2: The interleaved code symbol estimates of the interfering users $\hat{x}_k^{(n)}$ coming out of the single user APP decoders can be written as $\hat{x}_k^{(n)}=x_k^{(n)}+\hat{v}_k^{(n)}$ where $\hat{v}_k^{(n)}$ is uncorrelated with x and also uncorrelated over time and iterations, but not over users at a given iteration, i.e. $\langle x,\hat{v}_k^{(n)}\rangle=0$, $\langle \hat{v}_k^{(n)}, \hat{v}_k^{(m)}\rangle=0$ for $n \neq m$ and $\langle \hat{v}_k^{(n)}, \hat{v}_j^{(n)}\rangle=q_{kj}$.

Define $Q_k^{(n)}=\langle \hat{v}_k^{(n)}, \hat{v}_k^{(n)}\rangle$, with elements determined as shown above.

Let $c_k^{(n)}$ be according to (7). Under A1 and A2 the LMMSE estimate of $x_k$ given $c_k^{(n)}$ is given by the output $\tilde{x}_k^{(n)}$ of the recursive filter shown in FIG. 8.

The update for the estimate is $$\tilde{x}_k^{(n)}=\tilde{x}_k^{(n-1)}+m_k^{(n)}(\hat{x}_k^{(n-1)}-\tilde{x}_k^{(n-1)})$$

The filters in the figure are defined as follows:

$$m_k^{(n)}=-w_k^{(n)}(I+Q_k^{(n-1)}-W_k^{(n)})^{-1}$$

$$M_k^{(n)}=(I-W_k^{(n)})(I+Q_k^{(n-1)}-W_k^{(n)})^{-1}$$

with the recursive update equations for n=3, 4, . . .

$$w_k^{(n)}=w_k^{(n-1)}[I-(H_k^{(n-1)})^{-1}(I-W_k^{(n-1)})]^{-1}$$

$$W_k^{(n)}=W_k^{(n-1)}+(I-W_k^{(n-1)})(H_k^{(n-1)})^{-1}(I-W_k^{(n-1)})$$

$$H_k^{(n-1)}-I+Q_k^{(n-2)}-W_k^{(n-1)}$$

The initial conditions with $\tilde{x}_k^{(0)}=0$ and $x_k^{(0)}=0$ are $m_k^{(1)}=s_k^t(SS^t+\sigma^2 I)^{-1}$, $M_k^{(1)}=S_k^t(SS^t+\sigma^2 I)^{-1}$ for n=1 and $w_k^{(2)}=s_k^t(SS^t+I)^{-1}S_k$, $W_k^{(2)}=S_k^t(SS^t+\sigma^2 I)^{-1}S_k$ for n=2.

Computer simulations have been used to evaluate the proposed technique. For the purposes of simulation, each user used the maximum free distance 4 state convolutional code naturally mapped onto QPSK. Each user is therefore transmitting 1 bit per channel use. Binary spreading sequences with N=8 were generated i.i.d. at each symbol for each user. Transmission is chip synchronous and all users are received at the same power level.

Figure 9:
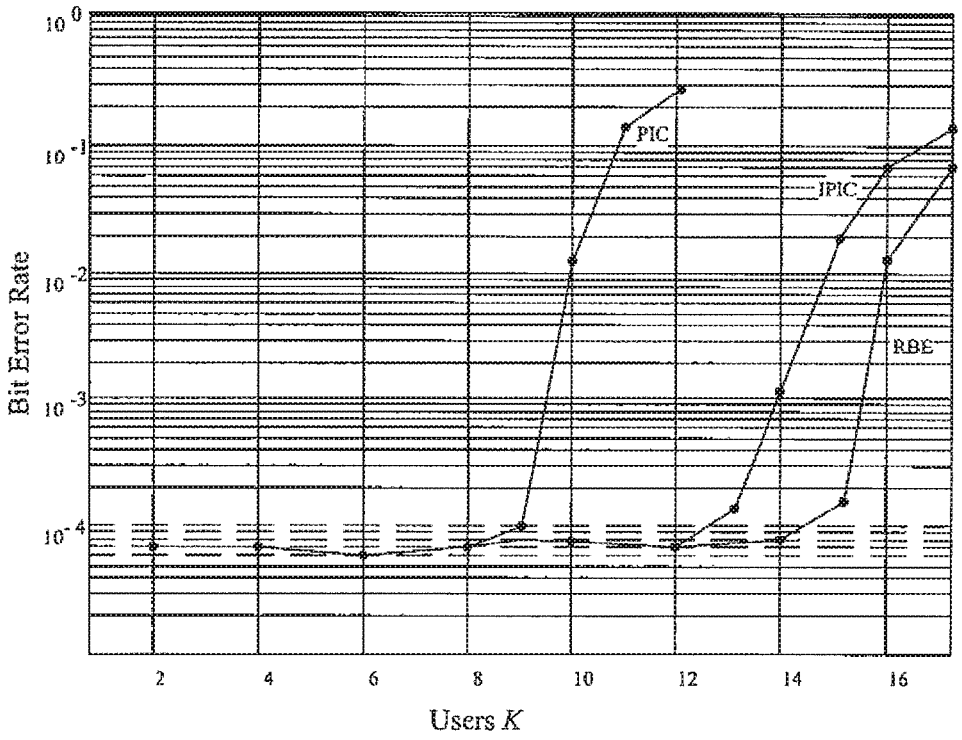
FIG. 9 depicts Bit Error Rate versus users after 10 iterations, N=8, $E_b/N_0$=5 dB in accordance with a first embodiment.

Indicative simulation results are shown in FIG. 9. Three curves are shown. PIC is the parallel interference cancellation method of [4]. IPIC is the improved parallel interference cancellation of [2]. RBE is the proposed recursive Bayesian estimation technique. Each of the curves begins for small numbers of users at the single-user BER near $10^{-4}$. As each receiver fails to converge, its curve deviates from single-user. For PIC, this occurs at K/N=1.125. For IPIC, the limit is 1.625 and for RBE 1.875. The performance benefit of IPIC over PIC is reported in [2]. The recursive Bayesian technique supports even higher loads. In fact, further numerical investigations (for smaller systems) have shown that RBE supports almost the same load as using the multiuser APP.

Described herein is a computationally efficient recursive filter for use in iterative multiuser decoding. This filter uses the entire history of outputs from the single user decoders in order to accelerate convergence and to support greater loads.

With reference to FIGS. 10 to 18 a second embodiment is described where there are a number of specific solutions offered which fall out from the general solution of (or realization that) adapting related art single pass OFDM receivers to iteratively receive signals at the sampling level allows the receiver to differentiate a desired packet from an observation of an interference (collision) signal at the receiver input. These solutions are as follows:

An overall system solution—Iterative Receiver Structure itself.

Additional solution aspect—Samples Estimates list.

Additional solution aspect—Information Bit Estimates list.

Additional solution aspect—Multiplexing of Time/Frequency Domain Channel Application Sample Estimates.

In one aspect, the second embodiment provides a system and method of receiving OFDM packets comprising the following:

a) sample a receiver input signal consisting of signals from one or more antenna;

b) add the input signal with one of a plurality of prior stored received packet sample estimates to determine a packet sample hypothesis;

c) determine an information bit estimate from the sample hypothesis for storage in an information bit estimates list;

d) determine an updated received packet sample estimate from the sample hypothesis for updating the plurality of prior stored estimates;

e) subtract the updated sample estimate from the sample hypothesis to determine a noise hypothesis and provide the noise hypothesis as the receiver input signal;

f) repeat steps a) to e) until at least one or more complete packets are accumulated in the information bit estimates list.

In another aspect, the second embodiment provides a system and method of providing a sample estimates list in an OFDM receiver comprising the following:

a) sample a receiver input signal;

b) determine a packet sample estimate from the sampled receiver input signal;

c) store the packet sample estimate;

d) determine a packet sample hypothesis by adding the receiver input with a selected previously stored packet sample estimate;

e) determine an updated packet sample estimate by decoding and re-transmission modelling the packet sample hypothesis;

f) update the selected previously stored packet sample estimate with the updated packet sample estimate.

In yet another aspect the second embodiment provides a system and method of providing a packet information bit estimates list in an OFDM receiver comprising the following:

a) determine a packet sample hypothesis by adding a receiver input with a selected previously stored packet sample estimate;

b) determine an information bit estimate by decoding the packet sample hypothesis with one or more of a hard decoding technique and a soft decoding technique c) storing the information bit estimate with one or more previously determined information bit estimates;

d) repeating steps a) to c) until a complete packet is accumulated.

In still another aspect, the second embodiment provides a system and method of determining a hybrid OFDM received packet sample estimate comprising the step of:

multiplexing a time domain channel application received sample estimate with a frequency domain channel application received sample estimate, such that the multiplexed time domain sample estimate is mapped to correspond to one or more of;

an OFDM signal cyclic prefix;

an OFDM tail portion, and;

an OFDM guard period, wherein the multiplexed frequency domain sample estimate is mapped to correspond to one or more of;

an OFDM signal preamble and;

an OFDM payload data symbol.

In another aspect the second embodiment provides an iterative sample estimation method for OFDM packet based network communication comprising the following steps:

a) selecting either the windowed matched received samples or the noise hypothesis as the input signal;

b) adding an empty packet estimate to a samples estimate list containing packet sample estimates;

c) selecting one of said list entries;

d) adding said packet samples estimate to said input signal to create a packet received samples hypothesis;

e) decoding and re-transmission modelling of said packet received samples hypothesis to create a new packet received samples estimate and new information bit estimates;

f) updating said information bit estimate list with new information bit estimates;

g) subtracting said new packet samples estimate from said packet received samples hypothesis to create a noise hypothesis; and h) updating said samples estimate list entry with said new packet samples estimate;

all said steps being iterated at least once for each packet.

In a further aspect the second embodiment provides an iterative sample estimation method according to the previous paragraph wherein step e) further comprises:

i) soft decoding said selected packet sample estimate to create soft encoded bits and new packet information bit estimates for reinsertion into said information bit estimates list;

j) soft modulating said soft encoded bits to create a transmitted symbol estimate;

k) constructing the time domain channel estimate from said packet received samples hypothesis and said transmitted symbol estimates;

l) constructing the packet transmit sample estimate from said transmitted symbol estimate;

m) convolving said time packet transmit sample estimate with said time domain channel estimate to create the time domain channel applied received samples estimate; and in parallel with steps k) and m);

n) constructing the frequency domain channel estimate from said packet received samples hypothesis and said transmitted symbol estimates;

o) multiplying said frequency domain channel estimate with said transmitted symbol estimates to create packet received symbol estimates; then p) constructing the frequency domain channel applied received samples estimate from the packet received symbol estimates; and q) multiplexing the time domain channel applied received samples estimate with the frequency domain channel applied received samples estimate for reinsertion into said samples estimate list, wherein steps n) to p) are repeated for each OFDM symbol in a packet.

In still another aspect, the second embodiment provides an iterative sample estimation method according to the paragraph previous to the preceding paragraph wherein step e) further comprises:

r) hard decoding said selected packet sample estimate to create hard encoded bits and new packet information bit estimates for reinsertion into said information bit estimates list;

s) hard modulating said hard encoded bits to create a transmitted symbol estimate;

t) constructing the time domain channel estimate from said packet received samples hypothesis and said transmitted symbol estimates;

u) constructing the packet transmit sample estimate from said transmitted symbol estimate;

v) convolving said time packet transmit sample estimate with said time domain channel estimate to create the time domain channel applied received samples estimate; and in parallel with steps t) and u);

w) constructing the frequency domain channel estimate from said packet received samples hypothesis and said transmitted symbol estimates;

x) multiplying said frequency domain channel estimate with said transmitted symbol estimates to create packet received symbol estimates; then y) constructing the frequency domain channel applied received samples estimate from the packet received symbol estimates; and z) multiplexing the time domain channel applied received samples estimate for reinsertion into said list.

With reference to FIGS. 10 to 18, the following blocks are used for receiver signal processing techniques in accordance with the second embodiment;

OFDM Soft Output Decode 288

OFDM Hard Output Decode 222

Encode 224

Soft Modulate 230

Hard Modulate 226

Acquisition 204

Matched Filter 202

Sum 208

Subtract 212

Convolve 236

Multiply 240

Time to Frequency Conversion (dependant on system standard) 234

Time Domain Channel Estimator 232

Frequency Domain Channel Estimator 238

Time, Frequency Domain Multiplex 220

Samples Estimate List (including associated Controller) 206

Information Bit Estimates List (including associated Controller) 213

Table 1 and Table 2 provide a key for the number signals and process in each figure and the reference numbers in the text.

TABLE 1

| Signals | |
|---|---|
| 1002 | Received Samples |
| 1004 | Windowed Matched Received Samples |
| 1006 | Empty Sample Estimates |
| 108 | Previous Packet Received Samples Estimate |
| 110 | Packet Received Samples Hypotheses |
| 112 | New Packet Information Bit Estimates |
| 114 | New Packet Received Samples Estimate |
| 116 | Noise Hypothesis |
| 118 | Completed Packet Information Bit Estimates |
| 119 | Packet Transmit Symbol Estimates |
| 120 | Time Domain Channel Applied Received Samples Estimate |
| 122 | Frequency Domain Channel Applied Received Samples Estimate |
| 126 | Hard Encoded Information Bits |
| 128 | Soft Encoded Information Bits |
| 130 | Time Domain Channel Estimate |
| 132 | Packet Transmit Samples Estimate |
| 134 | Frequency Domain Channel Estimate |
| 136 | Packet Received Symbol Estimates |

TABLE 2

| Functional Blocks | |
|---|---|
| 202 | Bandwidth Limiting Filter-Matched Filter-p(t) |
| 204 | Acquisition |
| 206 | Samples Estimate List |
| 208 | Σ-Add |
| 210 | OFDM Soft/Hard Decode and Re-transmit |
| 212 | Σ(−vc)-Subtract |
| 213 | Information Bit Estimates List |
| 214 | OFDM Soft/Hard Decode and Re-modulate |
| 215 | Hybrid Re-transmit |
| 216 | TDCA—Time Domain Channel Application |
| 218 | FDCA—Frequency Domain Channel Application |
| 220 | MDX—Time, Frequency Domain Multiplex |
| 222 | OFDM Hard Output Decode |
| 224 | Encode |
| 226 | Hard Modulate |
| 228 | OFDM Soft Output Decode |
| 230 | Soft Modulate |
| 232 | Time Domain Channel Estimator |
| 234 | F → T - 802.11a Frequency to Time Domain Conversion |
| 236 | Convolve - Linear Convolution |
| 238 | Frequency Domain Channel Estimator |
| 240 | Multiply |

The second embodiment of the invention is adapted for a Packet based OFDM WLAN system (eg. IEEE 802.11a, IEEE 802.11g). A typical receiver for such a system performs processing tasks in accordance with FIG. 10. The input into the system is a complex, oversampled baseband received signal 1002 for each attached antenna. The signal received on each antenna is passed through a band limiting filter 202 which is then followed by a packet detection and synchronisation (Acquisition) processing block 204. This Acquisition block uses one or more of the matched filter antenna signals 1004. Once a packet is acquired it is decoded using either hard or soft decoding techniques and passed on to a higher processing layer (eg. MAC). The typical receiver structure FIG. 10 may be modified to an iterative structure that provides interference cancelling at the sample level.

Iterative Receiver Structure & Function

Figure 11:
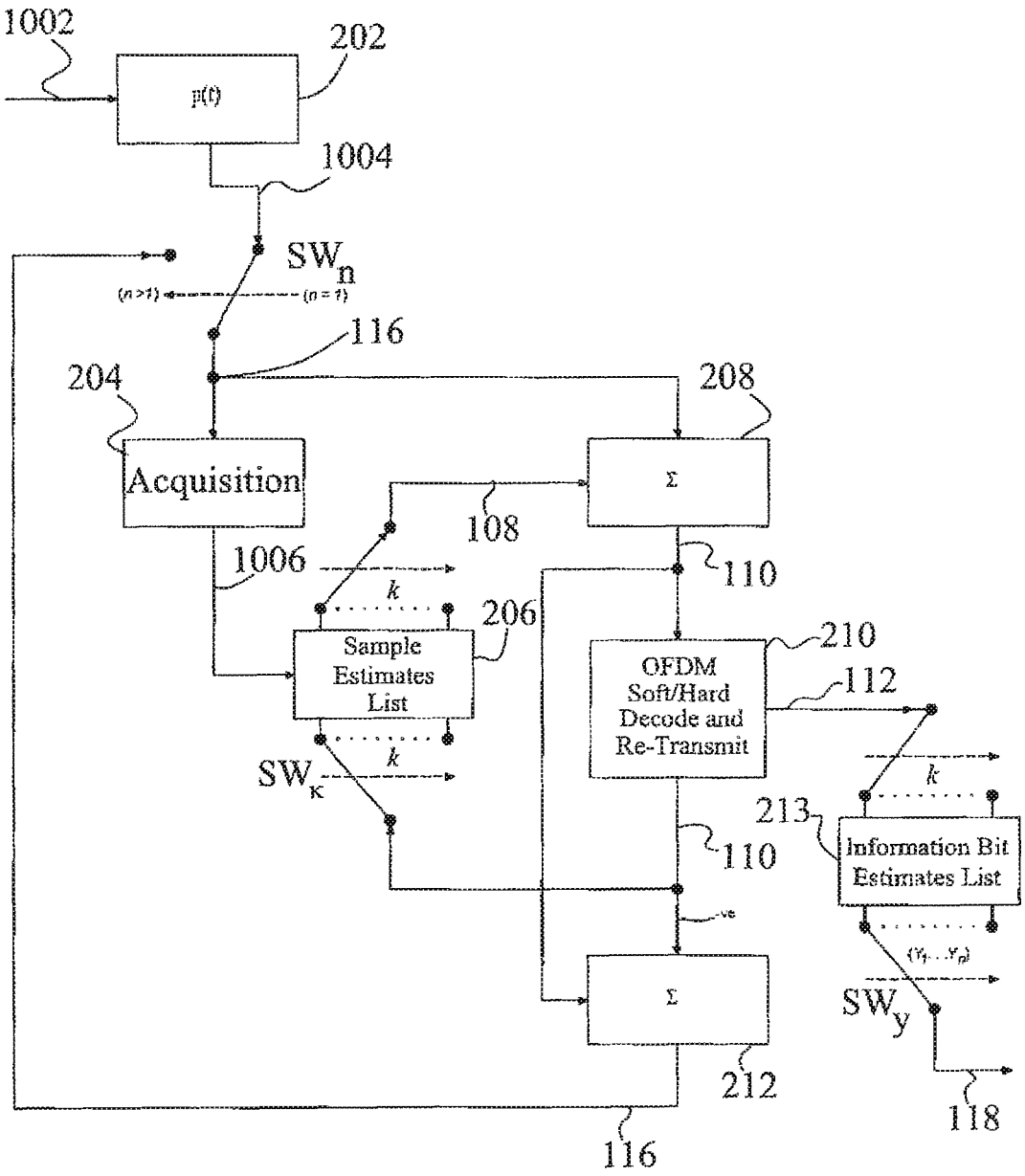
FIG. 11 illustrates an adaptation of the single pass OFDM receiver high level structure of FIG. 10 in accordance with a second embodiment to facilitate iterative receiver technologies.

The input to the receiver is the oversampled digital I/O baseband samples from each antenna connected to the receiver called the Received Samples 1002. The Received Samples 1002 are windowed over time and passed through a filter 202 matched to the pulse shape in order to produce windowed matched received samples 1004. This constitutes the Noise Hypothesis 116 for the first iteration (n=1). For all proceeding iterations (n>1), the Noise Hypothesis 116 is provided by the feedback of the interference signal. This is depicted in FIG. 11 by the n conditioned switch $SW_n$.

An iteration of the receiver is a single execution of each of the following processes:

Attempt to acquire a new Packet in the Noise Hypothesis 116 using the Acquisition 204 process.

If a new packet is found, add empty entries 1006 to the Samples Estimate List 206 and Information Bit Estimates List 213. Each entry in the Samples Estimates List 206 has a corresponding entry in the Information Bit Estimate List 213.

Determine, from the evolution of both Samples and Information Bit estimates list, Completed Packets $\{y_1 \ldots y_m\}$, in the Information Bit Estimates List 206.

Release to higher layer (MAC) then Remove Completed Packets $\{y_1 \ldots y_m\}$ from the Information Bit Estimates List 213.

Remove Completed Packets $\{y_1 \ldots y_m\}$ from the Samples Estimate List 206.

Select a Packet k in the Samples Estimate List 206 to Process.

Add 208 the Previous Packet Received Samples Estimate 208 of selected packet k from the Samples Estimate List 206 to the Noise Hypothesis 116 to produce the Packet Received Samples Hypothesis 110.

Generate new Packet Received Samples Estimate 114 and new information bit estimates 112 for the selected packet k from the Packet Received Samples Hypothesis 110 using OFDM Soft/Hard Decode and Re-transmit process 210.

Update the selected packets' k previous information bit estimates in the Information Bit Estimates List 213 with the New Information Bit Estimates 112.

Update the selected packets' k previous Samples Estimate in the Samples Estimate List 206 with the New Packet Received Samples Estimate 114.

Subtract 212 the New Packet Received Samples Estimate 114 from the Packet Received Samples Hypothesis 110 to produce the Noise Hypothesis 116.

Iterations are continually performed until all packets have been released from the Information Bit Estimates List 213. Once this state has been reached, the lists 206, 213 are cleared, the time window is updated and the entire process repeated.

Iterative Interference Cancelling

Interference cancelling at the sample level requires the generation of New Packet Received Samples Estimate 114 for each antenna using the OFDM Soft/Hard Decode and Re-transmit 210 process for every Packet found by the Acquisition 204 process. Each packet's New Packet Received Samples Estimate 114 are stored in the Samples Estimate List 206. The interference cancelling structure requires that each packet Adds 208 its Previous Packet Received Samples Estimate 108 to the Noise Hypothesis 116 before the Soft/Hard Decode and Re-transmit 210 process to produce the Packet Received Sample Hypothesis 110 for each antenna. The New Packet Received Samples Estimate 114 produced by the Soft/Hard Decode and Re-transmit 210 process are then Subtracted 212 from the Packet Received Sample Hypothesis 110 to generate an updated Noise Hypothesis 116. The New Packet Received Samples Estimate 114 are also used to update the Samples Estimate List 206. The Noise Hypothesis 116 is then fed back through the system (minus the latest estimated contribution of the previously processed packet) providing Iterative Interference Cancelling. FIG. 11 provides a graphical reference for this process.

Samples Estimate List

The Samples Estimate List 206 contains the New Packet Received Samples Estimate 114 as generated by the OFDM Soft/Hard Decode and Re-transmit process 210 for each receive antenna for each Packet found by the Acquisition 204 process.

For each iteration, a packet to iterate (k) is selected from the Samples Estimate List 204. The selection k can be based on numerous metrics e.g., sorted signal power, the minimum number of processing cycles performed, order of arrival. This selection is depicted by the k controlled switch $SW_k$ in FIG. 11, where k is the current selected packet.

Information Bit Estimates List

The Information Bit Estimates List 213 contains the latest New Packet Information Bit Estimates 112 as generated by the OFDM Soft/Hard Decode and Re-transmit 215 process for each Packet found by the Acquisition 204 process.

Each iteration provides an opportunity to release Completed Information Bit Estimates 118 to higher layers (e.g. MAC). The choice of which packets are complete is made by evaluating a metric for each packet in the Samples Estimate List 206. For example, this metric may be based on indicators such as signal power, the number of iterations performed and number of completed packets. These metrics are then compared to a target value. All packets that meet their target are marked for release from the Information Bit Estimates List 213.

For each packet acquired there is an entry in both the Samples Estimate List 206 and the Information Bit Estimates List 213. The selection of completed packets is depicted by the $\{y_1 \ldots y_m\}$ controlled switch $SW_y$ in FIG. 11, where $\{y_1 \ldots y_m\}$ is the list of Completed Packet Information Bit Estimates. A feature of the iterative receiver structure is that the packet's Packet Received Samples Estimate 114 remain subtracted from the Noise Hypothesis 116 even after it is released and its corresponding entries in both lists removed.

Hybrid Re-Transmission

Figure 12:
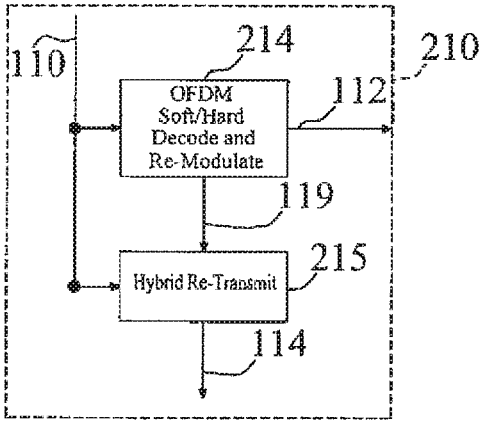
FIG. 12 shows a OFDM Soft/Hard Decode and Re-transmit structure for use in Iterative Receive structure in accordance with a second embodiment.
Figure 13:
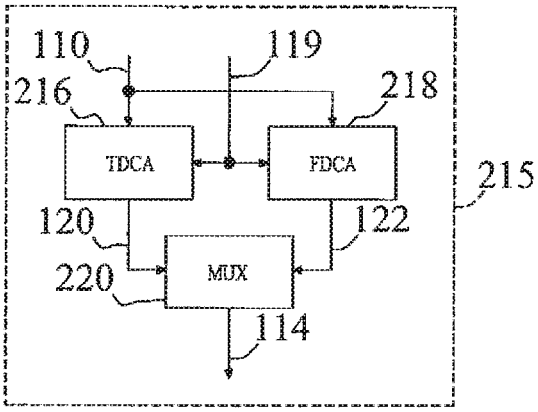
FIG. 13 shows a Hybrid Re-transmit in accordance with a second embodiment.
Figure 14:
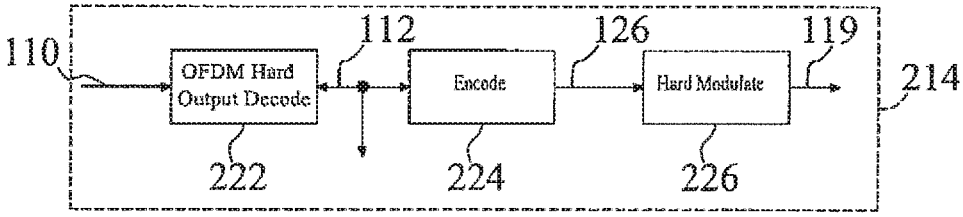
FIG. 14 shows a Hard Decode and Re-Modulate for OFDM Soft/Hard Decode and Re-transmit structure in accordance with a second embodiment.
Figure 15:
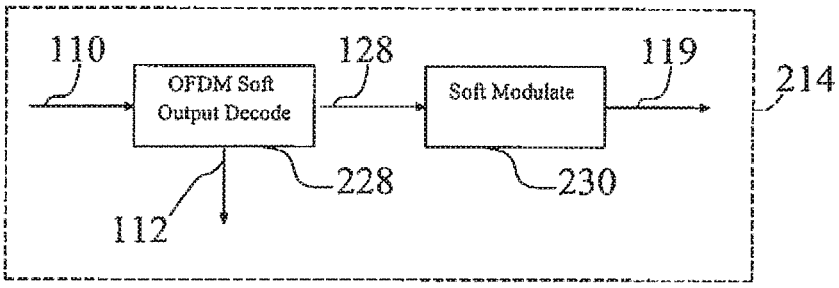
FIG. 15 shows a Soft Decode and Re-Modulate for OFDM Soft/Hard Decode and Re-transmit structure in accordance with a second embodiment.

The Hybrid Re-transmission 215 process is depicted in FIG. 12 and FIG. 13. It uses both Time Domain Channel Application 216 and Frequency Domain Channel Application 218 processes to generate a New Packet Received Samples Estimate 114. Both processes use the Packet Received Samples Hypothesis 110 for each antenna and Packet Transmit Symbol Estimates 119 to create Channel Applied Received Samples Estimate 120, 122 for each receive antenna. The Time Domain Channel Application 216 process produces a Time Domain Channel Applied Received Samples Estimate 120. The Frequency Domain Channel Application 218 process produces a Frequency Domain Channel Applied Received Samples Estimate 122. The Channel Applied Received Samples Estimate 120, 122 are then multiplexed 220 together to form the New Packet Received Samples Estimate 113 for each antenna. Each of these processes is described in further detail below.

Time Domain Channel Application (TDCA)

Figure 16:
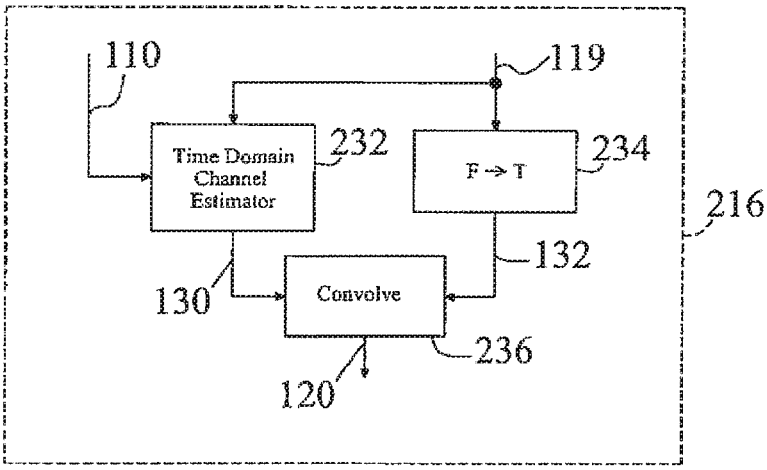
FIG. 16 shows a structure for time domain channel application process in accordance with a second embodiment.

The Time Domain Channel Application 216 process is further expanded in FIG. 16. The Time Domain Channel Estimator 232 produces a Time Domain Channel Estimate 130 for each receive antenna using the Packet Transmit Symbol Estimates 119 from the OFDM Soft/Hard Decode and Re-modulate 214 process (see FIG. 14 and FIG. 15) and the Packet Received Sample Hypothesis 110 for each antenna. The Frequency to Time Conversion 234 then produces a Packet Transmit Samples Estimate 132 using the Packet Transmit Symbol Estimates 119. The Packet Transmit Samples Estimate 132 and Time Domain Channel Estimate 130 for each antenna are then linearly convolved via the Convolve 236 process to produce the Time Domain Applied Received Samples Estimates 120 for each antenna.

Frequency Domain Channel Application (FDCA)

Figure 17:
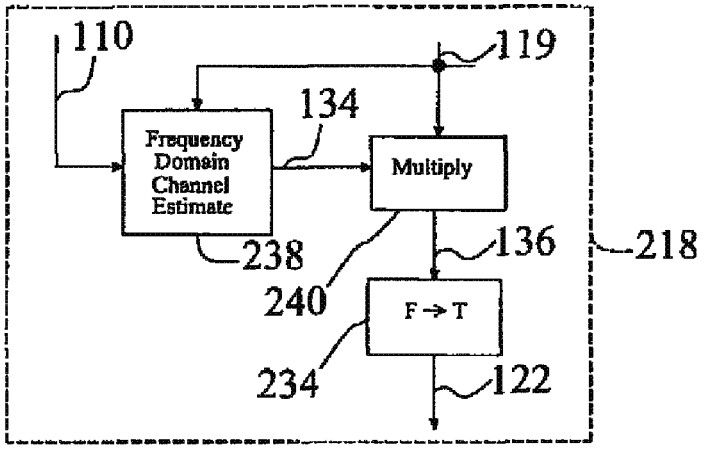
FIG. 17 shows a structure for frequency domain channel application process in accordance with a second embodiment.

The Frequency Domain Channel Application 218 process is further expanded in FIG. 17. The Frequency Domain Channel Estimator 238 produces a Frequency Domain Channel Estimate 134 for each antenna using the Packet Transmit Symbol Estimates 119 from the OFDM Soft/Hard Decode and Re-modulate 214 process and the Packet Received Sample Hypothesis 110 for each antenna. The Packet Transmit Symbol Estimates 119 are then multiplied, one OFDM symbol at a time, by the Frequency Domain Channel Estimate 134 via the Multiply 240 process to produce the Packet Received Symbol Estimates 136. The Packet Received Symbol Estimates 136 are then converted into the Frequency Domain Channel Applied Received Samples Estimate 122 using the Frequency-To-Time process 234.

Time, Frequency Domain Channel Application Multiplexing (MUX)

Referring now to FIG. 13, the Multiplexing 220 process takes the Time Domain Channel Applied Received Samples Estimate 120 and the Frequency Domain Channel Applied Received Samples Estimate 122 and multiplexes them together to produce a hybrid New Packet Received Samples Estimate 114.

OFDM modulation scheme such as those used in this second embodiment, commonly employ a cyclic prefix to combat multi-path interference. Also, due to time dispersion characteristics of both the radio channel and band limiting filters, there are tails at the beginning and end of the New Packet Received Samples Estimate 114. New Packet Received Samples Estimate 114 corresponding to the OFDM portion of the signal are taken from the Frequency Domain Channel Applied Received Samples Estimate 122. The remaining samples in the New Packet Received Samples Estimate 114 are taken from the Time Domain Channel Applied Received Samples Estimate 120. In this embodiment those samples comprise the cyclic prefix and tail portions of the New Packet Received Samples Estimate 114.

Figure 18:
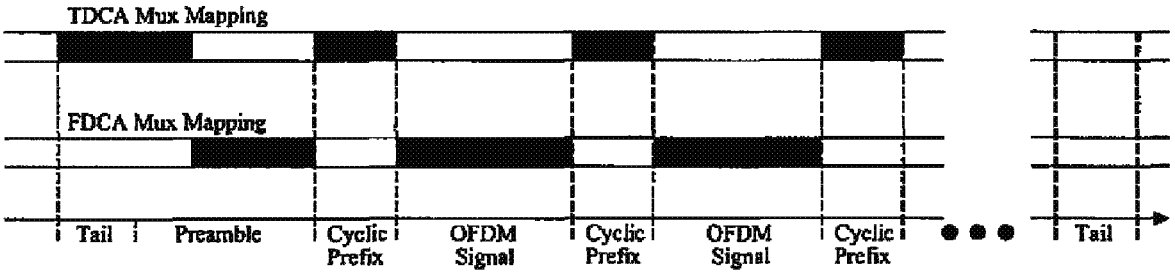
FIG. 18 shows an Example of a Typical OFDM Packet Physical layer Format and an associated Multiplexer mapping.

An example of multiplexer mapping is shown in FIG. 18.

Preferred Area of Application

The preferred areas of application for the second embodiment of the present invention are OFDM receivers that may be used with IEEE 802.11a, IEEE 802.11g, IEEE 802.16 and HiperLAN Wireless Local Area Network (WLAN) standards. However, the invention disclosed is useable in any packed based OFDM communications system as would be understood by the person skilled in the art.

With reference to FIGS. 19 to 23 a third embodiment is described which stems from the realization that reducing the distortions in one or more of the raw signals arriving at a receiver used to provide a decision statistic leads to an overall improvement in the decision statistic itself. Furthermore, appropriate selection of the means of reducing these distortions leads to a more reliable determination of packet arrival time.

In one aspect the third embodiment provides a method and apparatus for communicating in a multiple access communication network by synchronizing packets arriving at a receiver comprising:

receiving a packet input signal;

determining a correlation signal corresponding to the packet input signal;

processing the input and correlation signals such that at least one of the input signal and the correlation signal are filtered;

determining a decision statistic by combining a power component of the processed correlation signal with a power component of the processed input signal;

nominate a point in time given by a predetermined threshold condition of the decision statistic as a received packet arrival time.

The processing of at least one of the input and correlation signals is performed by one of a centre weighted filter having a triangular impulse response, a root raised cosine filter, a Hanning window filter, a Hamming window filter, or a combined Hanning/Hamming window filter. The predetermined threshold condition may be one of the decision statistic crossing the predetermined threshold or a maximum of the decision statistic occurring above the predetermined threshold. The determination of the correlation signal may be performed every Kth sample of a sampled packet input signal, where K is an integer greater than or equal to 1. The third embodiment of the present invention is described in more detail below.

Power Averaging Mask for FFT Window Synchronisation

Synchronisation of packets transmitted, especially over wireless media, is ordinarily achieved by employing a preamble comprised of several repetitions of the same signal and correlating the received signal with a delayed version of itself. The delay may be chosen to equal the duration of the repeated signal component defining the preamble. The output power of this correlation process is then usually normalised against the average power in the received signal. The point at which the normalised correlator output exceeds a threshold is selected as the packet arrival time. This technique has a number of deficiencies. For example, it does not optimally exploit the statistics of the correlator outputs and thus may introduce larger error margins in the determination of data packet timing. In this third embodiment, a method is disclosed which permits a more accurate determination of arrival time of a data packet. Thus synchronisation errors may be reduced and, consequently, packet loss rates are reduced. Specifically, the method uses a linear filtering approach to interpret the correlator outputs prior to powers being calculated, thereby improving the quality of the statistic used for packet synchronisation. This is achieved primarily due to the noise suppression properties of the filter. The shape of the linear filter may be optimally designed against the characteristics of the preamble and the radio channel. An example would be a root raised cosine filter, or a Hanning/Hamming window filter. One preferred embodiment of the invention is the use of a centre weighted average filter with a triangular impulse response for application to the correlator outputs. This filter enables more accurate location of the time of the packet arrival than is achievable otherwise and has an efficient implementation. It is also proposed to use the maximum correlation power, once a threshold is exceeded, as the decision point rather than the time at which the correlation power first crosses a threshold. Those practiced in the art will recognise that this method has potential application to any communication system that uses a repetitive preamble for packet synchronisation. The inventor has recognised that filters are widely used in general applications and that the synchronisation of packets may be treated as a filtering problem. Accordingly, the inventor proposes to use raw correlator outputs as a preferred filter input. The use of a centre weighted (or other) filter on the correlator outputs prior to power calculation is used as a measure of the arrival timing of a packet. Threshold testing of the normalised power of the received signal correlated with a delayed version of itself is also contemplated. The delay is equal to the repetition size of the preamble. The normalisation is achieved by dividing by the sliding window averaged power of the received signal. In this third embodiment it is particularly advantageous to provide a receiver with the following functions:

Filtering of raw correlator outputs;

Centre weighted averaged filter, preferably a triangular filter which has an efficient implementation;

The above allows for basing a decision point on the maximum of correlator output power rather than a first level crossing leading to better characterisation of packet timing to avoid packet transmission loss/inefficiency. The third embodiment may comprise a receiver technology for packet data transmissions where a repetitive preamble is deployed to determine packet data timing and allowing for adaptive design of filter form against the statistics of the radio channel.

Field of Application

The third embodiment technology applies to a point to point communications link where transmissions are made using a waveform structure that has a preamble of a particular type. Specifically the preamble may be formed by one or more repetitions of a base signal. The functional device embodying the technology preferably resides in the baseband receiver processor *191 of the baseband receiver* Rx of a general receiver 190, as previously discussed and, in this embodiment, in the exemplary form of a wireless modem 190 as shown in FIG. [19] *19a*. The relative logical location of the baseband receiver Rx is shown in [FIG. 19] *FIGS. 19a and 19b* as the "Baseband RX". *The baseband receiver processor 191 preferably resides in the baseband receiver RX as shown in FIG. 19a.*

Figure 20:
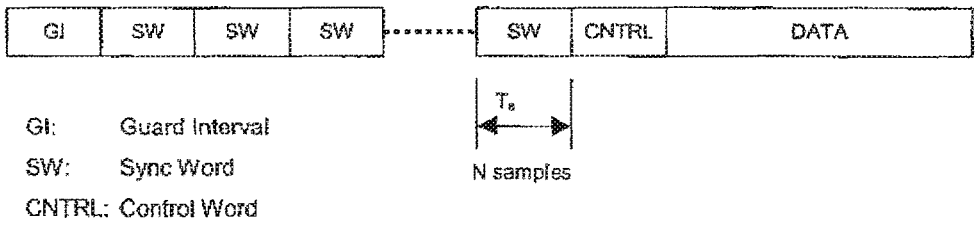
FIG. 20 illustrates a packet structure in accordance with related art.

In more detail, in packet based communications systems the timing of the arrival of a packet is determined at the receiver 190. Once this timing is determined the alignment of the remaining (typically data bearing) portions of the packet may be determined using a-prior knowledge of the packet structure. Therefore without accurate determination of the packet time packet errors may be prevalent. A common technique employed is to transmit a preamble at the start of the packet transmission that has a special structure permitting efficient arrival time determination at the receiver 190. This structure requires the repetition of a short signal several times in the preamble. The structure of a typical packet is shown in FIG. 20 where the Sync Word (SW) is repeated several times at the beginning of the transmission.

The conventional time synchronisation technique correlates the received signal with a delayed version of itself. This delay may be set to the length of the Sync Word and the correlation length may be set to the number of SW repetitions (L) minus one. This correlation is implemented every sample (or every $K^{th}$ sample where K is small, e.g. 4). If the received sample sequence is $\{r_{i-1}, r_i, r_{i+1}, r_{i+2}, \ldots\}$ then the correlator output at time i is $$\rho_i = \sum_{j=i}^{i+N(L-1)} r_j^* r_{j+N}$$

This correlation value is compared with the power in the observed sequence $$\sigma_i = \sum_{j=i}^{i+N(L-1)} r_j^* r_j$$

to form a decision statistic $|\rho_i^2|/\sigma_i^2$. The arrival time i is chosen when this metric exceeds a threshold.

Figure 21:
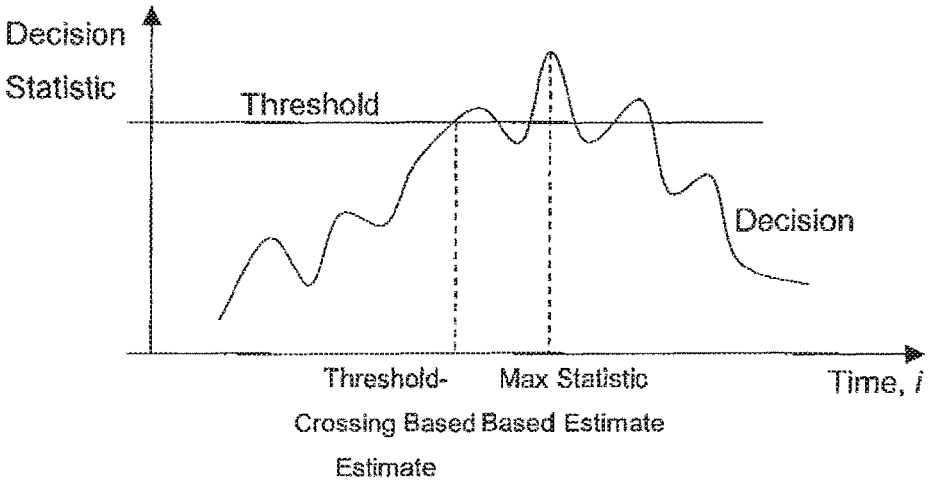
FIG. 21 illustrates an example related art time synchronisation decision.

The inventor has identified that any noise present in the received sequence $r_i$ is amplified by the squaring process and may cause the synchronisation technique to pick the incorrect arrival time. Rather than waiting for the statistic to cross a threshold, the algorithm may be adjusted to select the maximum statistic by including a small amount of decision delay. This maximum is chosen from those statistics above the threshold. A number of statistics crossing a given threshold is shown in FIG. 21.

Preferred Method

In this method according to the third embodiment of the invention the inventor exploits the profile of the autocorrelation of the preamble in order to mitigate the negative effects of noise of the time synchronisation performance. This may be achieved by filtering the sequences $\rho_i$ and $\sigma_i$ by a centre weighted low pass filter. Note that this filter is applied prior to the subsequent squaring of the sequences for decision statistic generation. Any noise presence will be better suppressed by filtering prior to squaring. The filter may be designed against the autocorrelation properties of the preamble but in a preferred embodied a triangle filter is employed.

Figure 22:
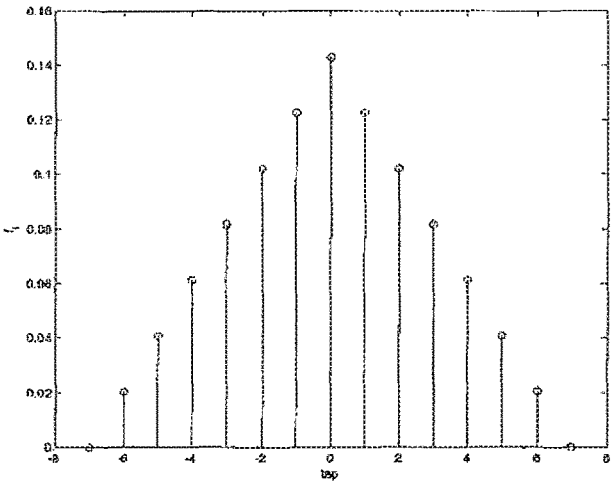
FIG. 22 shows triangle filter coefficients for a receiver filter in accordance with a third embodiment of the invention.
Figure 23:
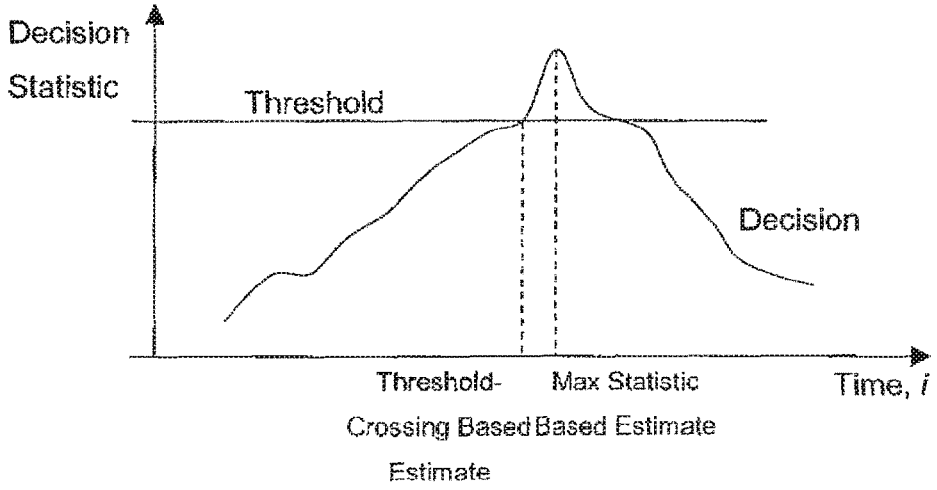
FIG. 23 shows an example of a filtered decision statistic in accordance with a third embodiment of the invention.

A triangle filter has an impulse response that is triangular in nature, specifically the coefficients (taps) of the (discrete time) filter are $$f_i = \frac{N - |i|}{N^2}$$

as shown in FIG. 22. If the filter described above is applied to the underlying sequences ($\rho_i$ and $\sigma_i$) then a typical result would be as shown in FIG. 23. It can be seen that the threshold crossing technique has benefited from the application of the filter, since it is now closer to the maximum as seen by inspection of FIG. 23. The effect of the noise has also been reduced therefore enhancing both the maximum and threshold crossing techniques. The preferred method is to apply the filter to both raw sequences, compute the metric using the filtered sequence and to use the maximum of the statistic that is above the threshold. Advantageously, a more accurate synchronisation of arrival time is achieved by filtering of the correlator output and power measurement processing prior to decision statistic generation; using a maximum search within a window defined by a threshold on the decision statistic.

By accurately estimating the arrival time of the preamble (and therefore the packet), the number of packet decoding failures may be significantly reduced. Apart from improving the chance of recovering the data payload this has flow on effects to the network users since both network control and data packets are now more reliably recovered.

Figure 35:
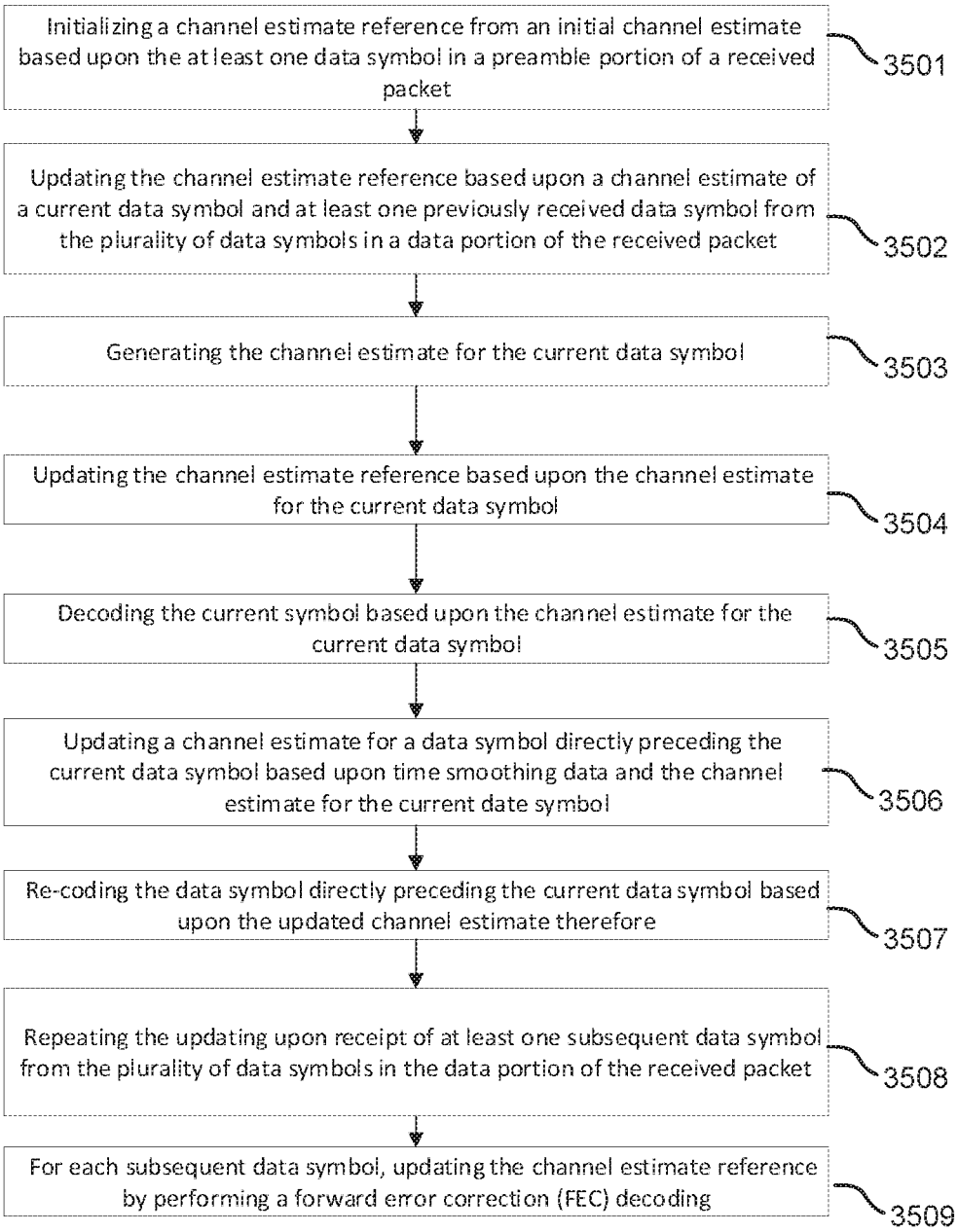
*FIG. 35 is a flow chart showing the steps of a method of communicating by tracking a plurality of time varying channels in a multiple access packet based communication network, according to an embodiment of the present disclosure;*

*FIG. 35 shows a flow chart showing steps 3501-3509 of a method of communicating by tracking a plurality of time varying channels in a multiple access packet based communication network, as described in the summary section and in the embodiments of the present disclosure.*

Figure 36:
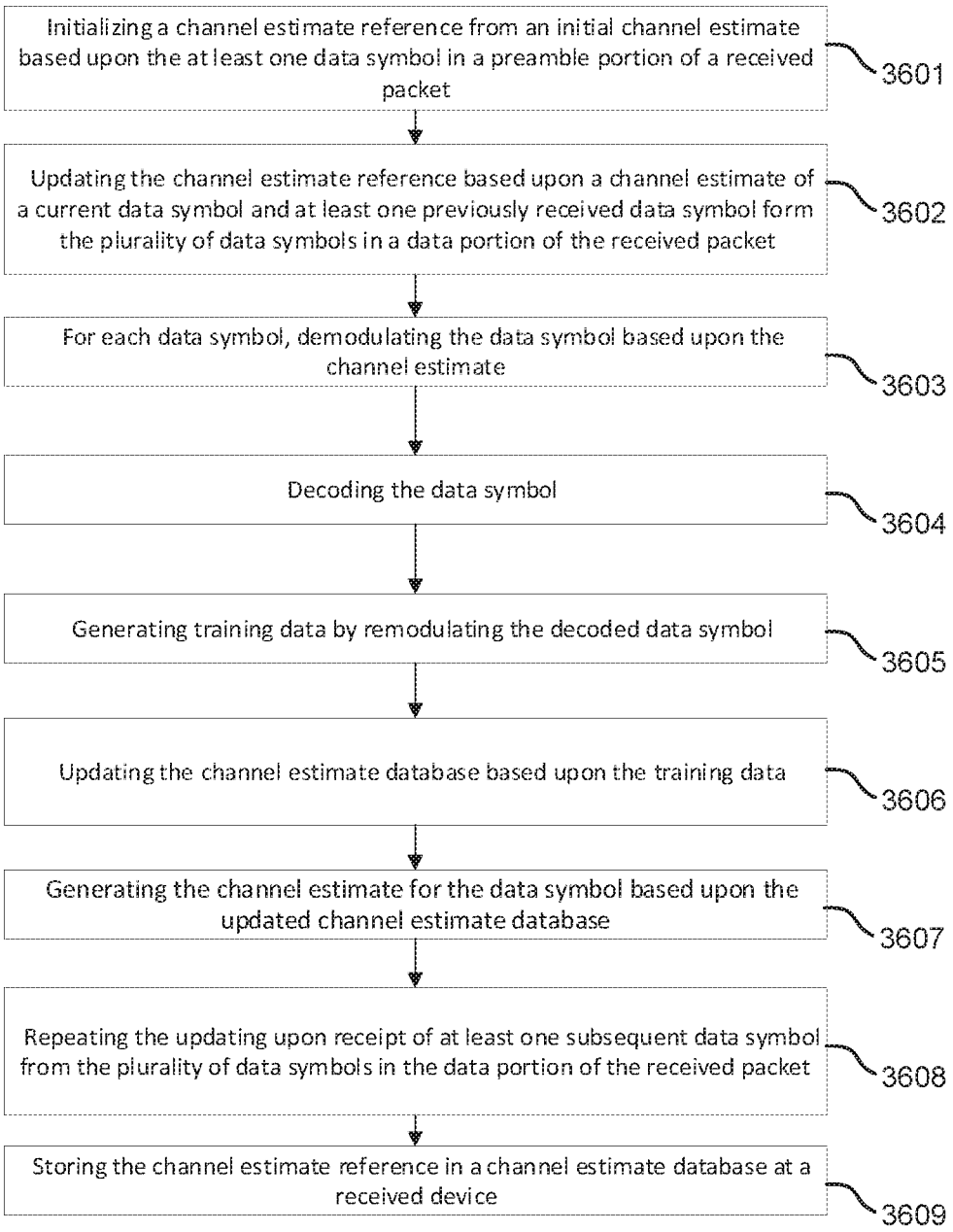
*FIG. 36 is a flow chart showing the steps of a method of communicating by tracking a plurality of time varying channels in a multiple access packet based communication network, according to a further embodiment of the present disclosure; and*

*FIG. 36 shows another flow chart showing steps 3601-3609 of a method of communicating by tracking a plurality of time varying channels in a multiple access packet based communication network, as described in the summary section and in the embodiments of the present disclosure.*

With reference to FIGS. 24 to 31 a fourth embodiment of the present invention is described in which the solution offered stems from the realization that receiver sensitivity may be improved by improving channel estimates using symbol estimates from the encoded portion of a packet and iteratively updating these channel estimates based on recently received data symbol channel estimates. A further aspect of the fourth embodiment resides in transforming each received data symbol to the frequency domain to enable the release of time smoothed channel estimates for improved decoding.

Advantageously, in the fourth embodiment, each OFDM symbol may be decoded more than once by obtaining a channel estimate for Symbol n, decoding symbol n, updating the channel estimate for symbol n, updating the channel estimate for symbol n−1 (by time domain smoothing from the new channel estimate for symbol n), decoding symbol n−1, updating channel estimate n−1.

In accordance with a fourth embodiment the present invention provides a method and system of tracking time varying channels in a packet based communication system comprising:

a) initializing a channel estimate reference based on an initial channel estimate derived from a received packet preamble;

b) updating the channel estimate reference based on a packet data symbol channel estimate in a coded portion of the current and all previous received data symbols;

c) repeating step b) at the arrival of subsequent packet data symbols.

Figure 37:
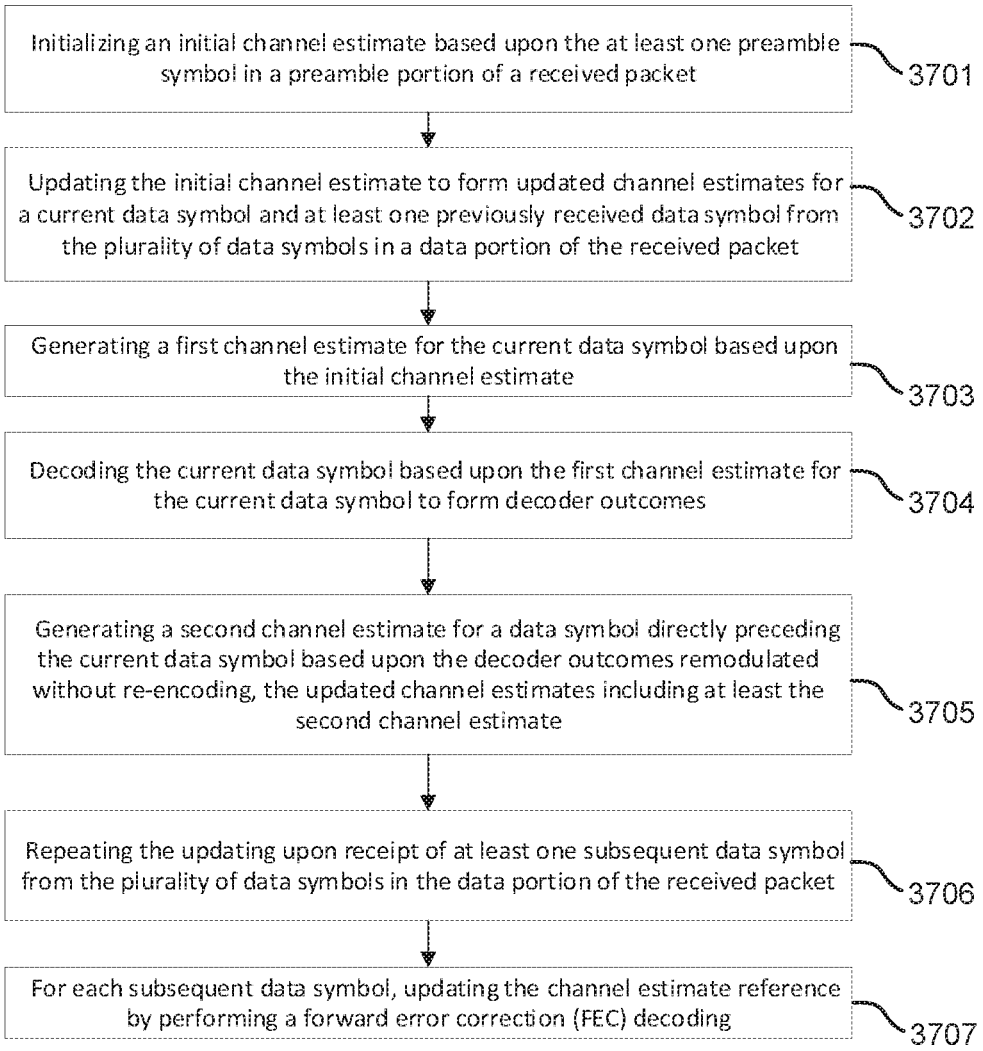
*FIG. 37 is a flow chart showing the steps of a method of estimating one or more time varying channels in a multiple access packet based communication network, according to a further embodiment of the present disclosure.*

*FIG. 37 shows a flow chart showing steps 3701-3707 of a method of estimating one or more time varying channels in a multiple access packet based communication network, according to the fourth embodiment of the present disclosure.*

The method preferably comprises storing the channel estimate reference in a channel estimate data base at the receiver. The method preferably comprises transforming the packet data symbol channel estimates to the frequency domain prior to updating the stored channel estimate reference to provide a time smoothed channel estimate reference. The method also preferably comprises for each subsequent received data symbol within step b), pipelining the steps of demodulating, modulating, and updating the channel estimate reference with the further step of FEC decoding.

In the current state of the art, high mobility high bandwidth transmission of information is limited by the inability of receiver processing techniques or methods to track the time varying nature of the radio channel and its effect on the transmitted signal and its waveform. Thus, related art systems for high mobility transmission support only low data rates. In this fourth embodiment, a receiver technique that exploits OFDM signal structures is disclosed and the fact that these OFDM signals are error control coded. Thus high mobility, high bandwidth data transmission is permitted. Additionally, the technique also benefits fixed communication radio networks by improving receiver sensitivity. Specifically, the fourth embodiment has been achieved by developing an algorithm that permits the reliable decoding of OFDM modulated packets of information that have been distorted by a rapidly varying radio channel, but without the need for compromising data rate by the excessive use of pilot or training signals.

In a preferred aspect of the fourth embodiment of the invention, an algorithm has been devised that may operate on a per OFDM symbol basis in order to avoid increased decoding latency and complexity. Correspondingly, in this embodiment, three statistics are exploited: the frequency domain statistics of the radio channel at the OFDM symbol rate; time domain statistics of the radio channel across OFDM symbols and; the outcomes of each decoded OFDM symbol. These statistics are used to estimate the radio channel from OFDM symbol to OFDM symbol. When a new OFDM symbol arrives the channel and data estimates are updated for the corresponding symbol and some small number of previous symbols. In this manner each OFDM symbol is decoded more than once with an improved channel estimate each time. Prediction of the radio channel from the received signal and knowledge of the preamble of the packet is deployed to initialise the process. That prediction uses the statistics of the radio channel. It will be evident to those practiced in the art that this embodiment permits the effective decoding of OFDM packets in rapidly varying radio environments. Thus it offers benefits in terms of supporting increased mobility at increased spectral efficiencies. It achieves this without increasing the implementation complexity, or latency, while simultaneously increasing receiver sensitivity. In this regard, it has potential in both high mobility and in fixed wireless networks. Those practiced in the art will recognise that this embodiment may be applied to any wide band modulation technique that shares a common underlying channel model similar to the preferred embodiment above. Some examples are the addition of multiple receive antennas, multi-carrier OFDM or multi-carrier CDMA.

Advantageously, the fourth embodiment provides:

Iterative channel and data estimation whereby the initial estimates are improved using data aided techniques.

Frequency domain smoothing stored across OFDM symbols enabling release of time smoothed channel estimates for improved decoding.

Decoder outcomes derive channel estimates stored in "CEDB" (channel estimate data base) described in more detail, below.

Prediction of channel from CEDB to start up OFDM symbol loop based processing.

Consequent low latency, high bandwidth high mobility data.

In this fourth embodiment a baseband digital receiver technology that enables the effective reception of high data rate signals from a mobile device travelling at high speed is disclosed. A brief performance analysis is also presented.

Field of Application

This technology applies to a point to point communications link where transmissions are made using coded Orthogonal Frequency Division Multiplex (OFDM). In general, coded OFDM transmissions are formed by 1. forward error correction (FEC) encoding, over one (OFDM) symbol duration, the information bits, then 2. conventional OFDM modulation.

The FEC coding over one OFDM symbol may be block coded or the coding may continue across multiple OFDM symbols but per OFDM symbol decoding techniques must be available. The receiver will exploit the coding on the OFDM symbols to improve performance.

As with the third embodiment, the functional device embodying the technology preferably resides in the baseband receiver processor *191 of the baseband receiver* RX of a receiver 190 in the exemplary form of a wireless modem 190 as shown in FIG. [19] *19a*. The relative logical location of the baseband receiver RX is shown in [FIG. 19] *FIGS. 19a and 19b* as the "Baseband RX". *The baseband receiver processor 191 preferably resides in the baseband receiver RX as shown in FIG. 19a.*

Latency and OFDM Symbol Based Processing Loops

In packet based communications systems it is important to implement the receiver processing with as little delay between the arrival of signals and the decoding of the bits contained in the signal as possible. This is important since the turn-around time for acknowledgements is a significant driver in the network performance. In OFDM modulated systems this requirement typically forces the use of per OFDM symbol processing. That is, when a new OFDM Symbols worth of signal arrives the Baseband Rx should release an OFDM symbols worth of information bits. The delay between the information enabling the decoding of an OFDM Symbol and the outcomes of decoding the Symbol must be of the order of a few OFDM Symbols duration.

OFDM Channel Estimation in Mobile Environments

In mobile radio communications systems coherent receiver designs typically require the use of accurate channel estimation methods in the baseband receiver. The channel to be estimated is a multipath fading channel induced by motion and reflections in the field. Among other uses, the channel estimate is employed to drive the FEC decoder, a critical aspect of the receiver. In the case of OFDM modulated signals the channel is normally measured in the frequency domain, after the received signal has been sliced up into OFDM Symbol sized pieces. In mobile communications systems the channel over which the signal travels changes with time and, if the vehicle speed is high enough, the channel may change during the reception of a packet. In related art receiver techniques it is assumed that the multipath fading channel is invariant over the packet enabling the one-off estimation of the channel at the start of the packet. In most standards (e.g. IEEE 802.11a) a preamble is transmitted at the start of a packet for exactly this purpose.

Preferred Method

In this method according to a fourth embodiment the partitioning of the received signal for OFDM to provide a convenient boundary for tracking time varying channels is exploited. The channel estimate changes from OFDM Symbol to OFDM Symbol. The preferred embodiment also exploits the fact that the OFDM symbol is encoded, enabling the use of decoded data as training information for the channel estimator. The statistics of the way that the channel changes with time and frequency are also exploited here.

An estimate of the channel in the frequency domain is obtained. The inventor defines the CEDB as a Channel Estimate Data Base containing channel estimates for each OFDM symbol, smoothed in the frequency dimension (across sub-carriers), but not in the time dimension. The method comprises the following steps, as set out below, for a packet with N OFDM symbols. Steps required for OFDM window synchronization occur prior to the processing shown here. The inner loop (3.4) is of length, L, OFDM Symbols and enables iterative channel and data estimation.

| Ref | Function |
|---|---|
| 1 | Estimate Time and Frequency Offsets based on Preamble |
| 2 | Initialise CEDB based on Preamble |
| 3 | For Each OFDM Symbol (n=1:N) { |
| 3.1 | Transform Rx OFDM Symbol into Frequency Domain (apply FFT) |
| 3.2 | Correct Rx OFDM Symbol for Time and Frequency offsets |
| 3.3 | Generate Channel Estimate for OFDM Symbol n by prediction from CEDB |
| 3.4 | For Each recent OFDM Symbol (m=n:−1:n−L) { |
| 3.4.1 | Demodulate OFDM Symbol m using Channel Estimate |
| 3.4.2 | FEC Decode OFDM Symbol (outcomes also released to upper layer) |
| 3.4.3 | Generate Training by remodulating FEC Decoder Outcomes |
| 3.4.4 | Update CEDB using Training and Corrected Rx OFDM Symbol |
| 3.4.5 | Generate Channel Estimate for OFDM Symbol m−1 from CEDB |
| | } |
| | } |

The channel prediction (step 3.3 above) and generate channel estimate (step 3.4.5 above) both apply CEDB time domain smoothing across OFDM symbols in their implementation. The strength of the smoothing (across Sub-Carrier and OFDM Symbol dimensions) are independently controlled by a process not described here.

Advantageously, the fourth embodiment provides:

1. Iterative Channel and Data Estimation whereby the initial estimates (resembling those that would be obtained conventionally) are improved (step 3.4) using data aided techniques.

2. Frequency Domain Smoothing stored across OFDM Symbols enabling release of time smoothed channel estimates for improved decoding (steps 2, 3.4.4).

3. Decoder outcomes drive channel estimates stored in CEDB (steps 3.4.3, 3.4.4).

4. Prediction of Channel from CEDB to start up loop based processing (step 3.3).

Parallelism may be exploited for implementation purposes by two processes running in parallel comprising.

1. demodulation, modulation and channel estimation stages (steps 3.4.1, 3.4.3, 3.4.4 & 3.4.5), and 2. FEC Decoding (step 3.4.2)

While Process 1 is working on OFDM Symbol n, Process 2 is working on OFDM symbol n−2. This offset requires the predictor in Ref 3.3 to look ahead one extra OFDM symbol.

The benefits obtained by use of this embodiment's technology are now described.

Complexity

By exploiting pipelining of the FEC decoder function the most difficult aspect of the receiver device is fully exploited while maintaining a highly adaptive capability in terms of the propagation environment.

Sensitivity

By accurately estimating the channel, the performance of the decoder stage may be significantly improved (typically in excess of 1 dB increase in receiver sensitivity). This has been found to be the case even for time-invariant channels and is realized by exploiting data symbols for training purposes. In the case where mobility exists the ability of the receiver to track the channel in time allows the receiver to operate effectively where conventional systems may fail. At the same time, the benefits of iterative (multi-visit) estimation of the data symbols are realized.

Latency

By employing per OFDM symbol processing and pipelining the FEC decoder the inventor has obtained the earliest possible release of high quality data estimates. Therefore the receiver operates without increasing latency relative to conventional techniques. It should be noted that conventional techniques may fail in high speed mobile conditions. Performance Analysis In this section an example of the data and channel estimates that are obtained using conventional, idealised and the proposed receiver processing techniques are provided. The attributes of the communications link used in the example are shown in the table below.

| Quantity | Value | Unit |
|---|---|---|
| Bandwidth | 16.0 | MHz |
| Carrier Freqency | 5.0 | GHz |
| Number SubCarriers | 256 | SubCarriers |
| OFDM Symbol Duration | 16 | us |
| OFDM Symbols Per Packet | 38 | OFDM Symbols |
| Mobile Unit Velocity | 30 | $ms^{-1}$ |
| CoherenceFrequency | 3.0 | MHz |
| Bits Per SubCarrier | 2 | Bits |
| Pilot SubCarrier Spacing | 32 | SubCarriers |
| Eb/No | 8.0 | dB |
| FEC Rate | 1/2 | |
| FEC Memory | 5 | |

-continued

| | Value | Unit |
|---|---|---|
| Derived | | |
| Channel Coherence Frequency | 48.0 | SubCarriers |
| Channel Coherence Time | 62.5 | OFDM Symbols |
| Packet Length | 640.0 | us |
| Doppler Frequency | 0.5 | kHz |

Figure 24:
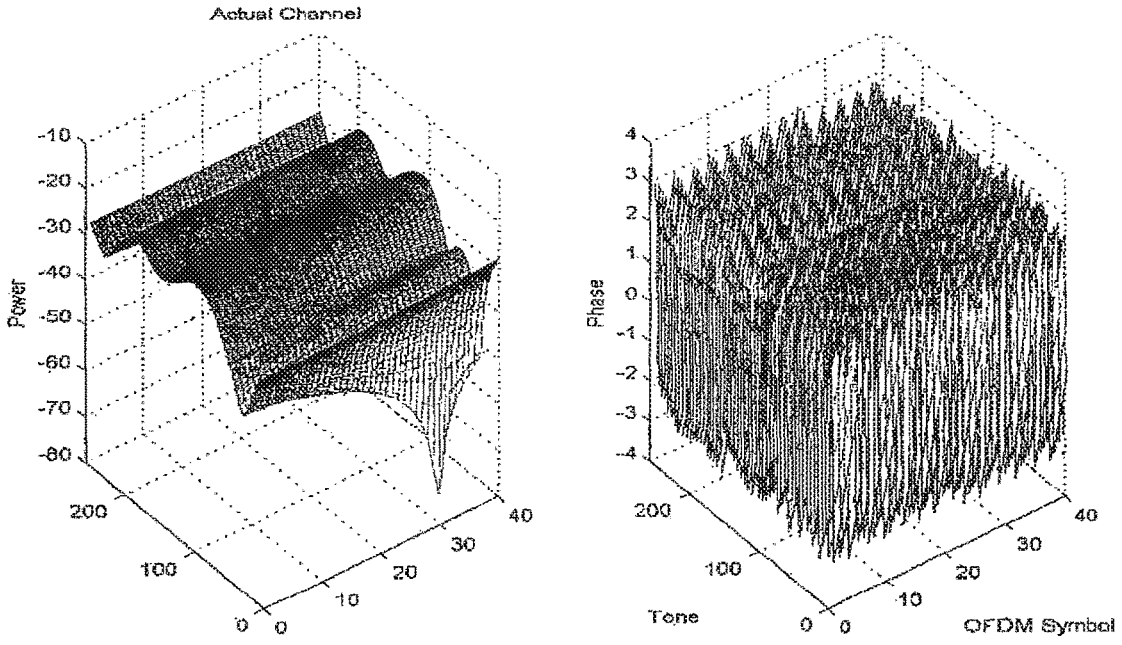
FIG. 24 represents an actual frequency domain of a related art radio channel.
Figure 25:
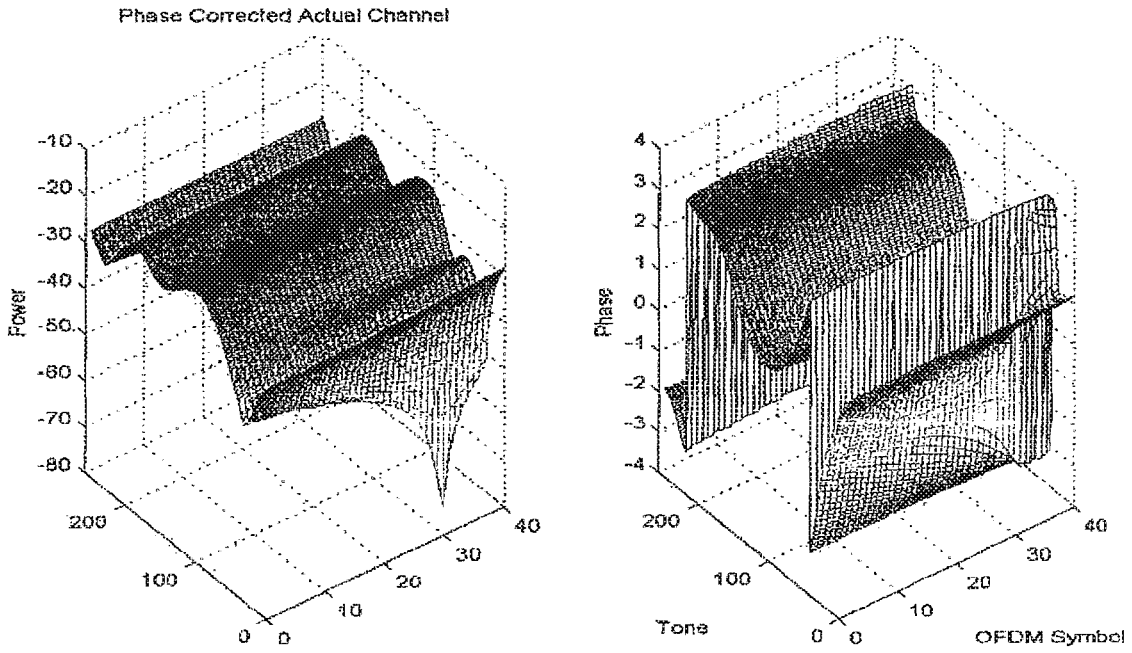
FIG. 25 represents the frequency domain of FIG. 24 after receiver phase and frequency offset correction.

The actual radio channel (measured after FFT application in the receiver) is shown in FIG. 24. The rapid phase rotations in the Phase plot result from FFT window misalignment and residual intermediate frequency in the down-conversion step. These are both real-world impairments. The receiver estimates both of these parameters and may be compensated for them on a symbol by symbol basis. The result of this correction is shown in FIG. 25. Note that this figure represents the actual radio channel corrected by an estimated quantity and is shown here for assessment purposes. An objective of the receiver is to accurately estimate this corrected channel.

Conventional Processing

Figure 26:
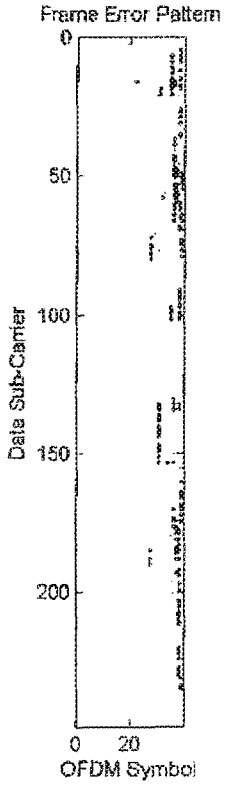
FIG. 26 represents an error pattern for a related art processing of a receiver.
Figure 27:
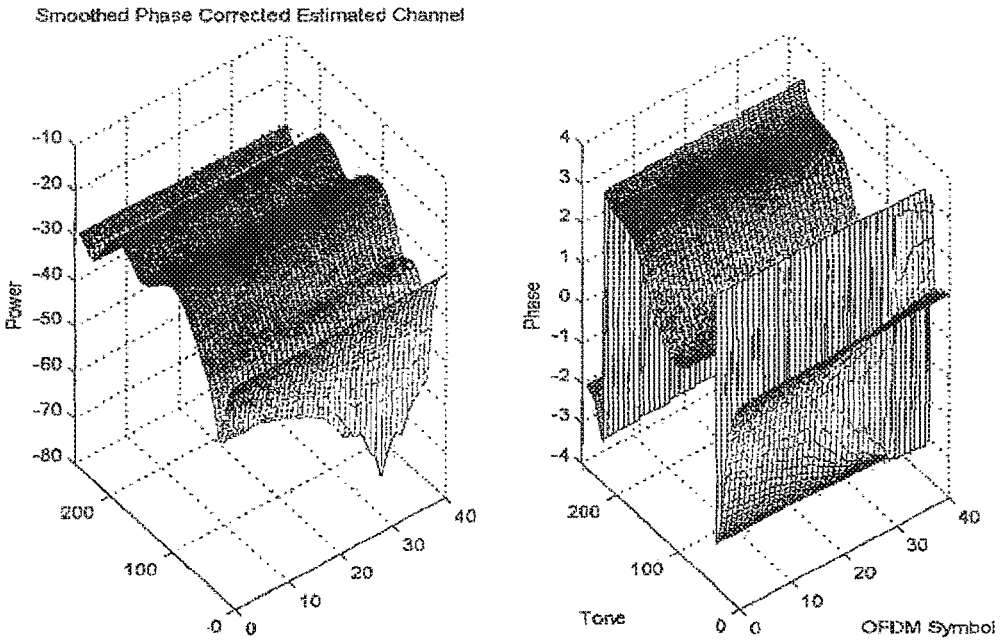
FIG. 27 represents a radio channel estimate after smoothing across OFDM symbols in accordance with a fourth embodiment of the invention.

In conventional processing the radio channel is estimated based on the preamble only. The main restriction with this approach is that the radio channel (after correction) must be invariant across the frame. As shown in FIG. 25 this is not the case since there is a phase change at around OFDM symbol 30 in some of the sub-carriers. It is therefore expected that decoder failures starting at around OFDM Symbol 30 of the packet will occur. This is indeed the case as shown in FIG. 26.

Preferred Method (Perfect Training Symbols)

Figure 28:
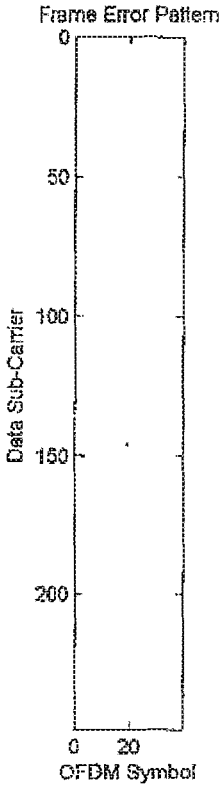
FIG. 28 represents an error pattern for a fourth embodiment of the invention using perfect training symbols.

FIG. 28 shows the performance of the proposed system is shown with the possibility of decoder failures for training symbol generation eliminated. The decoder outcomes for data recovery are still recorded hence the errors in FIG. 28. This represents the best possible case for data aided radio channel estimation. It is possible to compare this result with that obtained using decoder outcomes for training in the following section. Note that the number of errors has dramatically reduced relative to the conventional technique.

Preferred Method

Figure 29:
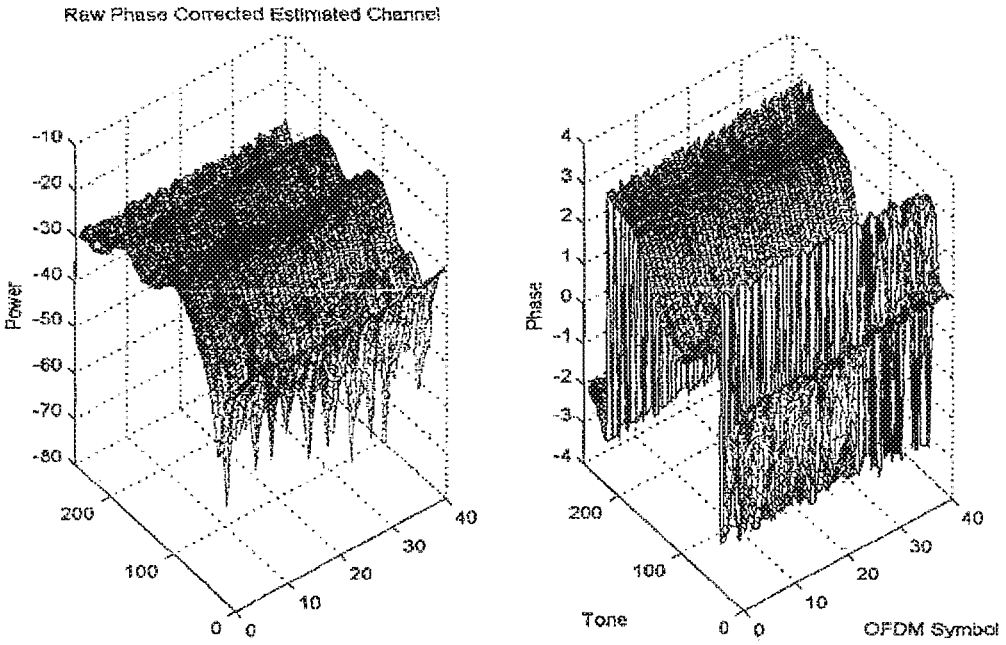
FIG. 29 represents a raw radio channel estimate or channel estimate database in accordance with a fourth embodiment of the invention.

In this section the performance of the proposed method is evaluated. The CEDB is shown in FIG. 29 and represents a good estimate of the radio channel even though smoothing across OFDM symbols has not been employed. The smoothing across sub-carriers is however evident. Once the smoothing across OFDM symbols is employed a very good match to the actual radio channel is observed, as shown in FIG. 28. As can be seen in FIG. 28 and FIG. 29 the error obtained using the proposed method results in the same error pattern as the idealised method. The error performance is vastly superior to the conventional method as shown in FIG. 26.

With reference to FIGS. 30 to 34 a fifth embodiment is described, which stems from the realization that receiver sensitivity may be improved by use of the outputs of a receiver's decoder as additional pilot or training symbols and updating these iteratively with each symbol received for the recalculation of a channel estimate, and frequency and time offsets as they vary throughout a packet.

In one aspect the fifth embodiment provides a system and method of communicating in a multiple access packet based network by estimating time varying channel impairments, where channel impairments comprise channel variation, signal frequency offset and signal time offset, comprising:

a) initializing a set of channel impairment estimates based on initial pilot and preamble symbols included in a received packet;

b) performing a decoder operation which comprises processing the set of channel impairment estimates and the received packet to determine a set of transmit symbol estimates;

c) updating the set of channel impairment estimates through use of the determined set of symbol estimates and received packet;

d) repeating steps b) and c).

In another aspect the fifth embodiment provides a system and method of communicating in a multiple access network by time varying channel estimation in a receiver for receiving transmitted packets, comprising:

a) estimating a frequency offset based on information included in a received packet preamble;

b) correcting a received signal using the estimated frequency offset;

c) determining a channel estimate using information included in the received packet preamble;

d) transforming a sample sequence of the received signal into the frequency domain such that the sample sequence includes OFDM symbols and intervening cyclic prefixes;

e) performing a decoding operation which comprises processing the determined channel estimate and received packet;

f) generating a transmission sample sequence using the decoding results and information in the received packet preamble;

g) transforming the transmission sample sequence into the frequency domain;

h) updating the determined channel estimate by combining the received sample sequence and the transmission sample sequence in the frequency domain;

i) repeating steps e) to h).

In a further aspect the fifth embodiment provides a system and method of communicating in a multiple access network by time varying channel estimation in a receiver for receiving transmitted packets, where the receiver retrieves OFDM symbols from a received signal and transforms the retrieved symbols to the frequency domain, comprising:

a) determine a matrix of training symbols comprised of symbol estimates derived from a decoder;

b) determine a matrix of frequency domain received OFDM symbols;

c) determine an intermediate channel estimate matrix by multiplying the OFDM symbol matrix by the conjugate of the training symbol matrix;

d) determine an intermediate matrix of training weights comprising the absolute value of the training symbol matrix;

e) perform a smoothing operation on both intermediate matrices comprising 2 dimensional filtering;

f) determine the channel estimate by dividing the smoothed channel estimate matrix with the smoothed training weight matrix.

In yet another aspect the fifth embodiment provides a system and method of communicating in a multiple access network by estimating offsets in a receiver for receiving transmitted packets, comprising:

a) determine a matrix of received OFDM symbols;

b) determine a matrix of conjugated data symbols wherein the data symbols comprise one or more of preamble, training and estimated symbols;

c) determine a 2 dimensional Fourier transform matrix comprised of the received symbol matrix multiplied with the conjugated symbol matrix;

d) filter the Fourier transform matrix;

e) determine time and frequency offsets by locating peak power occurrences within the filtered Fourier transform.

The fifth embodiment provides reliable estimation of channel impairments. In the related art, that is, in the theoretical rather than practical context, decoder outcomes are employed to assist with the estimation of channel coefficients and synchronisation of received signals in radio communications systems and radio networks. The difficulties encountered with these present theoretical approaches to decoder outcomes include the appropriate treatment of the uncertainty of these decoder outcomes in what would otherwise be conventional channel estimation and synchronisation techniques. In other words, the difficulty of applying one-shot or preamble-only channel estimation techniques or processing to an iterative process leads to less efficient and less accurate channel estimate and synchronisation performance. With this in mind, in this embodiment the use of a channel estimation and a synchronisation technique that employ an entire packet's worth of decoder outcomes (in addition to the preamble) is described. While others also have advocated this approach (at least in general terms), in the present embodiment, the specific method to manage uncertainty in the decoder outcomes and subsequent processing are distinguished from the related art by the features described here below. In this embodiment, in estimating the channel, the inventor first employs the frequency domain version of the remodulated decoder outcomes and preamble as training symbols. Then compute the frequency domain channel estimate from this training symbol sequence and from the frequency domain version of this the received signal. This may be achieved by either division or by minimum mean square error estimation or, via other estimation techniques. Any errors in the decoder outcomes will be dispersed similar to the use of an interleaver and not have direct impact on a local region of the channel estimate.

It should be noted that the channel estimation approach of the fifth embodiment is able to track the channel as it varies across the packet by slicing the packet up into segments that are assumed invariant. Thus the practical impact of this embodiment is that more reliable channel estimates provide the opportunity for significantly improved information packet recovery in radio communications.

In another aspect, the synchronisation technique, the inventor employs the preamble and decoder outcomes to remove the effects of data modulation on the received signal and then applies a 2 dimensional Fast Fourier Transform. By then executing a peak power search estimates of both the residual time and frequency offsets are obtained. These may then be employed to enable effective synchronisation.

In another aspect a channel estimator has been provided. This aspect employs the outcomes of soft FEC Decoding (e.g. SOVA) to improve the quality of the radio channel estimate so that repeating the decoding step, using the new channel estimate, offers improved outcomes. These soft outputs are used to generate soft training symbols. Firstly, multiply the received OFDM Symbol matrix by the conjugate of the Soft Training symbols to get an intermediate raw channel estimate. Then compute a further intermediate matrix of training weights equal to the absolute value, or absolute value squared, of the each of the soft training symbols. Both of these matrices are then smoothed using filters based on channel statistics. The channel estimate is then obtained by dividing the smoothed raw channel estimate by the smoothed training weight matrix in an element wise fashion. The impact of this aspect on high mobility, high data rate communications networks will be evident to those practiced in the art. Accordingly, lower packet loss rates impact on network capacity. The method also increases the ability to accommodate rapidly changing radio channels and more reliably decode data transmissions. Likewise, increased receiver sensitivity leads to reduced packet loss rates and increased range for OFDM based systems with high velocity nodes.

The following acronyms are used in this description of the fifth embodiment.

| | |
|---|---|
| APP | A-Posterior Probability |
| DSP | Digital Signal Processor |
| FEC | Forward Error Correction |
| FFT | Fast Fourier Transform |
| IF | Intermediate Frequency |
| IFFT | Inverse FFT |
| OFDM | Orthogonal Frequency Division Multiplex |
| RF | Radio Frequency |
| SOVA | Soft Output Viterbi Algorithm |

This fifth embodiment of the invention provides a suite of baseband digital receiver technologies that enables the effective reception of high data rate signals from a mobile device travelling at high speed.

Field of Application

This suite of technologies applies to point to point communications links where transmissions are made using coded Orthogonal Frequency Division Multiplex (OFDM). As noted above, coded OFDM transmissions are formed by forward error correction (FEC) encoding, over one (OFDM) symbol duration, the information bits, then conventional OFDM modulation.

The FEC coding over one OFDM symbol may be block coded or the coding may continue across multiple OFDM symbols but per OFDM symbol decoding techniques should be available. The receiver may exploit the coding on the OFDM symbols to improve performance.

Typically the technology resides in the baseband receiver processor of a wireless modem. This location is shown in FIG. 19 as the "Baseband Rx"

In packet based communications systems it is important to implement the receiver processing with as little delay between the arrival of signals and the decoding of the bits contained in the signal as possible. This is important since the turn-around time for acknowledgements is a significant driver in the network performance. In OFDM modulated systems this requirement typically forces the use of per OFDM symbol processing. However as signal processing capabilities improve it is envisaged that another, more powerful option, will become available to system designers. The more powerful technique will employ the entire observation in making decisions about every bit transmitted (e.g. Turbo Codes). In current techniques only a portion of the received signal is employed to assist with the decoding of any particular information bit. Typically, a local channel estimate may be formed using a portion of the observation and then decoding for that portion may be executed. The benefit of employing the observations, to follow, to assist with channel (or any other unknown parameter) estimation is currently not realised due to implementation complexity and performance of currently available DSP technology. Here the fifth embodiment provides techniques that employ the entire observation to improve the channel estimation and hence reduce decoder errors. In addition, the transmitted waveform is often structured to permit per OFDM symbol processing at the receiver. If this requirement is relaxed, frame based channel coding techniques may be applied to further improve the performance of the communications link. Examples of these techniques are the use of packet level interleaving and Block (e.g. Turbo) coding which may offer large performance benefits.

OFDM Channel Estimation in Mobile Environments

In mobile radio communications systems coherent receiver designs require the use of accurate channel estimation techniques in the baseband receiver. The channel to be estimated is a multipath fading channel induced by relative motion and multiple propagation paths between the transmitter and receiver and residual errors due to Transmit/Receive radio mismatch. The channel estimate is employed, among other uses, to drive the FEC decoder, a critical aspect of the receiver. In the case of OFDM modulated signals the channel is normally measured in the frequency domain, after the received signal has been separated into OFDM Symbol sized pieces and transformed via the application of an IFFT. In mobile communications systems the channel over which the signal travels changes with time and, if the vehicle speed is high enough, the channel may change over the duration of a packet. This translates to the channel experienced at the start of the packet being substantially different that experienced at the end of the packet when viewed from the receiver. Related art receiver techniques assume that the multipath fading channel is invariant over the packet, enabling the calculation of a single channel estimate at the start of the packet to decode the entire packet. In most standards that use OFDM transmission schemes (e.g. IEEE 802.11a) a preamble is transmitted at the start of each OFDM symbol in order to permit estimation of the radio channel at the start of the packet.

However, the quality of the communications link may be increased by employing the use of data aided techniques in the estimation of the radio channel. In this case, the result of applying the FEC decoder on the received signal generates an estimate of the transmitted symbols which, while not absolutely accurate, are suitable for exploitation as additional pilot symbols. Typical examples of data aided channel estimation for OFDM are implemented in the frequency domain and therefore suffer power losses due to discarding of the cyclic prefix from each received OFDM symbol. The discarded cyclic prefix is theoretically useful for channel estimation and typically accounts for 10-50 percent of the received signal energy. Since the transmitted symbols determining the cycling prefix may be estimated at the receiver, this energy is potentially useful, as illustrated below, in the estimation of the radio channel and should not be discarded.

Frequency and Time Offset Estimation

Figure 30:
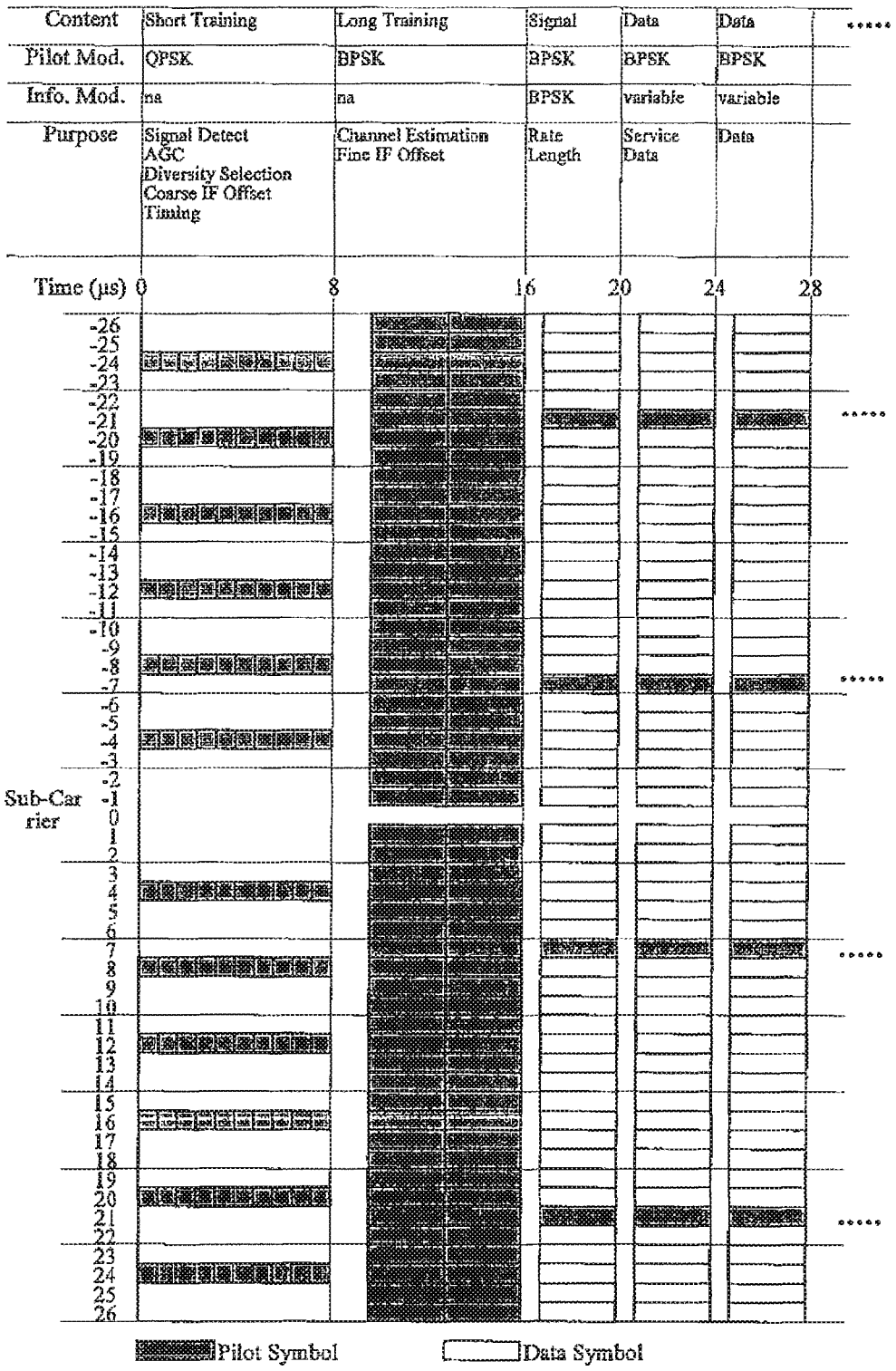
FIG. 30 is an example of a WLAN packet format in accordance with related art.

Frequency offset arises due to the imprecise down conversion of the received signal from RF or IF to baseband. Time Offsets are commonly caused by inaccuracies in the packet arrival time estimation due to the impact of multipath fading channel and noise. Multipath, or Time dispersive, channels result in multiple copies of the transmitted packet arriving at the receiver at different times therein decreasing the certainty in the time of arrival of the packet. Conventionally, estimates of the frequency and time offsets are initially made using the preamble of the packet and maintained using pilot symbols, inserted by the transmitter, throughout the packet (e.g. 802.11a). An example of this packet format for 802.11a is shown in FIG. 30.

Frequency offsets manifest as inter carrier interference and a constant phase rotation across OFDM Symbols and Time offsets manifest as phase rotations across the OFDM Sub-Carriers. The inventor assumes that fine Inter-frequency offset estimation is required consistent with the residual errors after an initial frequency offset correction. The phase offsets induced in the received symbols are due to the combined effects of the data modulation, transmission across the radio channel, imprecision in the frequency synchronisation during down conversion and imprecise time of alignment of the OFDM symbols during the time to frequency conversions. In order to estimate the radio channel, the effect of the data symbols (be it preamble, pilot or unknown) on the received signal must first be removed, thereby leaving only the effect of the radio channel and time/frequency offsets. In the case of preambles and pilots the symbols are known a-priori and hence their removal is possible at the receiver. Using related art methods, the parts of the observation that are effected by data are not available to aide in the estimation of the frequency and time offsets since the data symbols are not known at the receiver. The fifth embodiment, however, employs data aided techniques to significantly improve the performance of the estimation by making many more symbols available to the estimation process.

Proposed Method

The method proposed here is an iterative process that uses the outputs of the decoder as additional pilot symbols for recalculation of the channel estimate and for the recalculation of the frequency and time offsets as they vary across the packet. Collectively herein we shall refer to effects of the multipath channel combined with the frequency offsets induced by the RF or IF to baseband conversion and the time offsets caused by time misalignments in the time to frequency conversion as channel impairments. On the first iteration, the channel impairments are estimated using the pilot and preamble symbols nominated by the transmission scheme. These estimates are used to drive the initial execution of the decoder and generate the first transmit symbol estimates. Iterations thereafter use the transmit symbol estimates of the previous iteration as new pilot symbols to aid in the estimation of the channel impairments. The new channel impairment estimates are then used to re-run the decoder and generate new symbol estimates. This process may be repeated I times where I is the number of iterations and is an integer greater than equal to zero.

The details of the specific channel impairment estimators will be described in the following sections.

Channel Estimation

Two methods are available for estimation of the radio channel. One may be used when the radio channel is said to be invariant over the duration of the packet or discrete subsection thereof. The other is applicable when the radio channel varies over the duration of the packet.

Sequence Based Channel Estimation for OFDM

The sequence based channel estimator described here applies when the channel is invariant over a packet or, any substantial fraction thereof. This technique exploits all of the available received energy and is implemented prior to the OFDM symbol slicing conventionally employed in receivers for OFDM signals. The steps executed are as follows

| Ref | Function |
|---|---|
| 1 | Estimate Frequency Offset using Preamble |
| 2 | Correct Received Signal for Frequency Offset |
| 3 | Estimate Channel using Preamble |
| 4 | Convert Rx Sample Sequence to Frequency Domain |
| 5 | For Some Number of Iterations { |
| 5.1 | Decode Packet using Current Channel Estimate |
| 5.2 | Generate Tx Sample Sequence using Decoder Outcomes & Preamble/ Pilots |

-continued

| Ref | Function |
|---|---|
| 5.3 | Convert Tx Sample Sequence to Frequency Domain |
| 5.4 | Estimate Channel By Dividing Rx Sample and Tx Samples in Freq Domain |
| | } |

Steps 1 through 3 are common operations performed in typical OFDM receivers. Step 4 would not normally be found in an OFDM receiver. Conventionally the received sequence is sliced up into small OFDM Symbol periods, separated by Cyclic Prefix regions which are discarded. Each of these OFDM Symbols is transformed into the frequency domain by an FFT for processing (channel estimation, decoding, etc) as in step 5.1. Step 4 converts all parts of the received sample sequence that represents an entire packet or, selected portion thereof, including the cyclic prefix regions into the frequency domain to enable frequency domain channel estimate at the sequence level. This requires the other steps (5.2 and 5.3) which produces a hypothesis of the entire packet's frequency domain transmitted signal. In the frequency domain the received signal is equal to the transmitted signal multiplied by the channel plus any noise. This fact is exploited in step 5.4. The step in 5.4 could be replaced with an optimal linear estimator based on the Minimum Mean Squared Error criterion.

Channel Estimation with Soft Training Symbols

The channel estimator described here operates in the frequency domain of a conventional OFDM receiver. It is assumed that the received signal has be sliced up into OFDM Symbols, the Cyclic prefix discarded and the resulting OFDM Symbols converted to the frequency domain, via the use of an FFT. These processes are found in conventional OFDM receivers. The proposed method of the fifth embodiment is an iterative process that uses the symbol estimate outputs of the FEC decoder as additional pilot symbols or "Soft Training Symbols" in a re-estimation of the radio channel. By doing so (while noting these symbol estimate outputs may not be precise) the estimate of the radio channel is improved such that a subsequent execution FEC decoder produces an improved result over the previous execution.

Many different types of "soft output" decoders are available presently, including Soft-Output Viterbi Algorithms (SOVA), A-Posteriori Probability (APP) Decoders and various types of Turbo Codes. These soft outputs are used to generate soft training symbols according to techniques that may be found in the relate art literature, which would be understood by the person skilled in the art. It is the use of these soft training symbols which requires careful consideration and an improved technique is proposed here.

In the absence of noise, and other impairments, a received OFDM Symbol is equal to the multiplication of the transmitted OFDM Symbol and the frequency domain channel. If an OFDM system has N sub-carriers (frequency bins) then we may define vectors of length N to represent the transmitted data $d_i$ and radio channel $h_i$ for some OFDM Symbol period i. The received OFDM symbol in this case is $r_i=d_i.*h_i$, where the operator '.*' corresponds to element-wise multiplication of the vectors. In the case where $d_i$ is known perfectly at the receiver (e.g. if it were a pilot symbol) then the channel could be recovered perfectly in this ideal noise free case as $$\hat{h}_i=r_i./d_i=h_i$$

where, similar to the '.*' operator, the './' operator corresponds to an element-wise division of the vector elements. In data aided techniques the decoder outcome, $\hat{d}_i$ is used instead of the actual transmitted data. This estimate is subject to errors. The fifth embodiment involves a technique that accounts for this uncertainty in the "training" symbols. The method may be employed for time varying or invariant radio channels and takes a slightly different form depending of the channel variation. The following is a description of the estimator for time varying radio channels.

Assume the following is provided:

1. an entire packets worth of received OFDM Symbols R, and 2. an entire packets worth of soft training symbols D (some may be "hard" pilot symbols).

Figure 31:
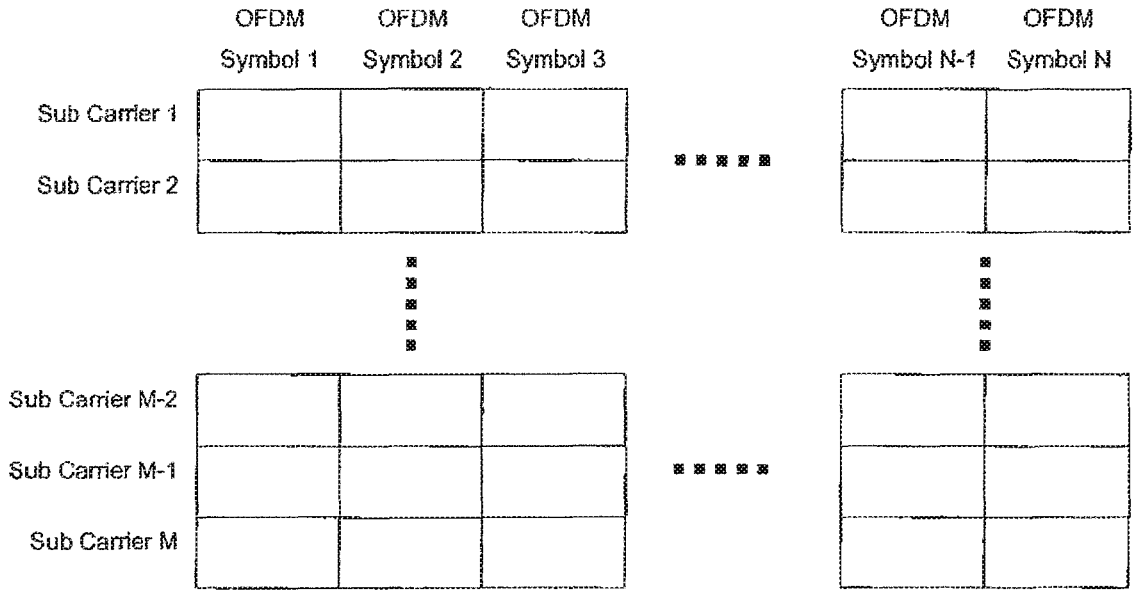
FIG. 31 is an OFDM symbol sub-carrier matrix structure in accordance with a fifth embodiment of the invention.

It is possible to structure these two objects as matrices as shown in FIG. 31 for M sub-carriers and N OFDM Symbols, where the rows are sub-carriers (tones or frequency bins) and the columns are OFDM Symbols (time).

Firstly, multiply the received OFDM Symbol matrix by the conjugate (denoted X*) of the Soft Training symbols to get an intermediate raw channel estimate V=R.*D*. Note that the conventional step (as described above) would prescribe a division, not a multiplication. Then compute a further intermediate matrix of training weights T=|D| or other functions such as absolution value squared. Then apply smoothing to both of these matrices using a two dimensional filter (f) matched to the channel coherence time and frequency. This filter outcome may be approximated by implementing smoothing independently in the time and frequency domains (rows then columns or vice versa) to save complexity. The estimate of the time varying channel is then derived as $$\hat{H}_i=f(V)./f(T)=f(R.*D^*)./f(|D|)$$

The uncertainty in the decoder outcomes is accounted for in the step where the absolute value of the training symbols was obtained. Small training symbols result from uncertain soft output from the FEC decoder step. A soft output FEC decoder will output a zero when a reliable estimate cannot be determined. Multiplication (in the R.*D* step) by a zero effectively excludes that symbol estimate from the channel estimation process. Note that in the next iteration the symbol estimate may have firmed up, due to improved statistics driving the FEC decoder, increasing its reliability and therefore it may now be included in the channel estimation process. In the ideal case the decoder will output correct, hard decisions and all data symbols will be used as perfect training to yield a very accurate channel estimate.

In the case that the channel is assumed time invariant across the packet the filtering function simply adds up the column and resulting in a column that is assume to apply over the entire packet.

In some cases, an approach whereby the two dimensional filter f applied to the raw channel estimate and training weight is different may be warranted. In these cases the time varying channel estimate would be $$\hat{H}_i=f_1(V)./f_2(T)=f_1(R.*D^*)./f_2(|D|)$$

where $f_1$ and $f_2$ implement different filters.

Joint Time and Frequency Offset Estimation using 2D FFT

In this aspect of the fifth embodiment we remove the effect of the data on the phase difference between adjacent symbols in the OFDM received matrix as shown in FIG. 31 and then apply a 2 Dimensional FFT. This removal may be achieved by multiplying the observed OFDM Symbol matrix with a corresponding matrix of conjugated data symbols be they preamble, training or estimated. The FFT output is then filtered to suppress noise, and a search for the peak power across the resulting 2 Dimensional space of metrics is executed. The filtering will have an impact on the maximum offsets that may be measured and it is therefore recommended that only very weak filtering be employed. The location of the peak, in terms of relative position in the rectangle of FIG. 31, determines the time and frequency offsets.

The granularity and range of the estimation is limited as follows. If there are M Sub Carriers and N OFDM Symbols then the range and resolution available from this technique is as shown in the following

| | Resolution | Value |
|---|---|---|
| Frequency Offset | OFDM Symbol Frequency/N | OFDM Symbol Frequency |
| Time Offset | OFDM Symbol Duration/M | OFDM Symbol Duration |

An example for the system parameterised by is now given.

| Parameter | Value |
|---|---|
| Number Of Tones | 256 |
| Number Of Symbols | 20 |
| Coherence Tones | 40 |
| Coherence Symbols | 50 |
| Actual Freq Offset | 0.05 |
| Actual Time Offset | 0.20 |

Figure 32:
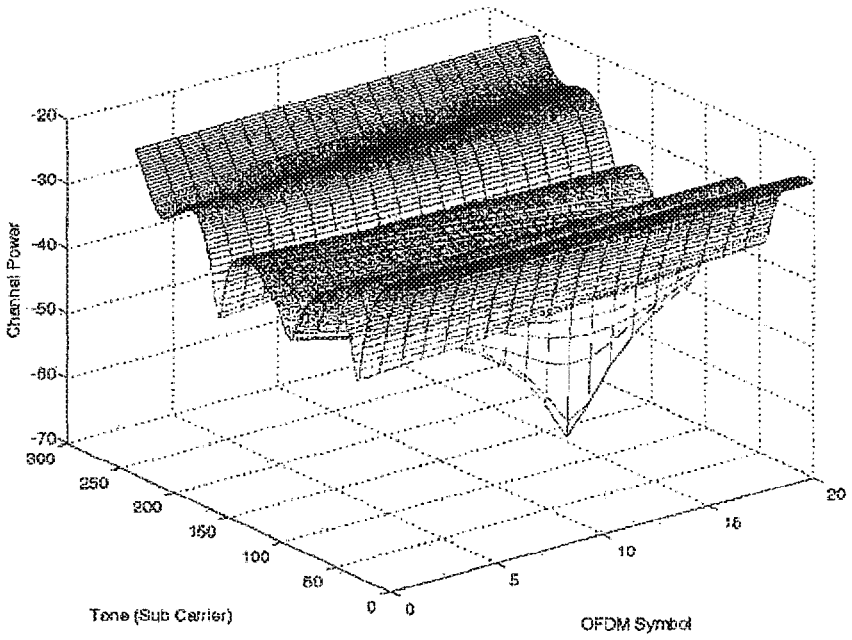
FIG. 32 is a representation of channel power (amplitude) over a sub-carrier and OFDM symbol resulting from application of a fifth embodiment of the invention.
Figure 33:
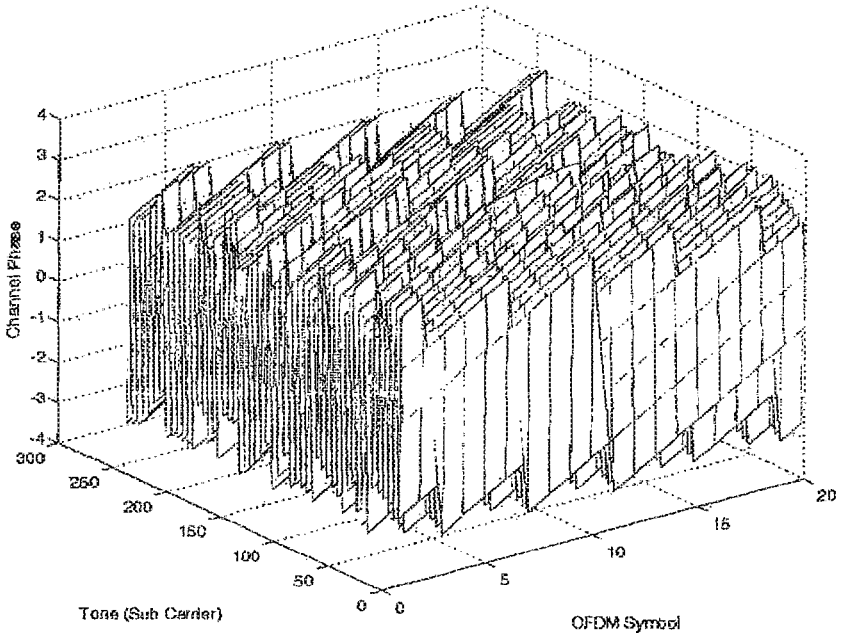
FIG. 33 is a representation of channel phase corresponding to the waveform represented in FIG. 32.
Figure 34:
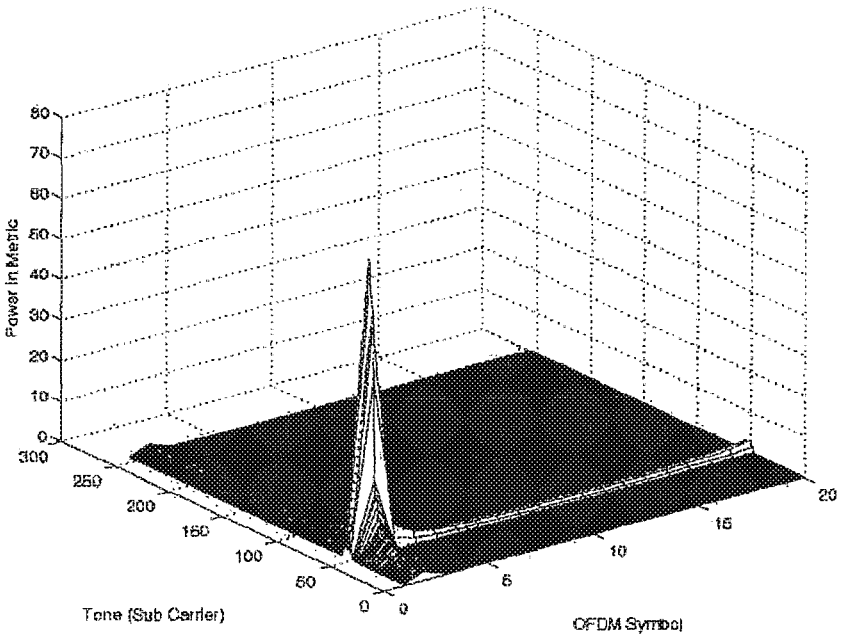
FIG. 34 is a representation of a synchronisation metric of a sub-carrier and OFDM symbol in accordance with a fifth embodiment of the invention[.]

With the actual channel amplitude and phase shown in FIG. 32 and FIG. 33 we get the metric shown in FIG. 34 for peak detection. Note that the peak is in the expected relative position, i.e. a fraction of 0.05 along the OFDM Symbol dimension and a fraction of 0.2 along the sub-carrier dimension. These estimates match the actual time and frequency offsets as shown in the above table of parameter values in the model.

By accurately estimating the channel, the performance of the FEC decoder stage is significantly improved, typically in excess of 1 dB increase in receiver sensitivity. This is true even for time-invariant channels and is realized by exploiting data symbols for training purposes. In the case where mobility exists the ability of the receiver to track the channel in time allows the receiver to operate effectively where related art systems may fail. At the same time, the benefits of iterative estimation of the data symbols are realized.

In a sixth embodiment the present invention provides a solution predicated on the use of firstly correlating the received signal at each antenna of a multiple access communication network with a known signal preamble and then statistically combining the correlated signal sequence of each antenna based on estimated antenna signal strength. It should be noted that in order to determine the coefficients for combining an initial timing estimate must be determined. The calculation of these coefficients will require, in practice, initial coarse timing and frequency offset estimation by other means. The quality of the initial timing estimate may be worse than that desired ultimately. The inventor considers further processing on the combined signal will lead to a timing estimate of high quality.

In a first aspect the sixth embodiment provides a system and method of communicating in a multiple access packet network by synchronizing a received signal in a multi antenna receiver comprising:

correlating a received signal observation at each of a plurality of antennae with a known signal preamble to provide a received signal sequence;

determine a power signal of each received signal sequence;

combine the determined power signals in accordance with a time averaged weighting based on estimated antenna signal strength for each antenna;

determine a time of arrival for the received signal in accordance with a predetermined threshold condition.

An preferred aspect of the sixth embodiment of the invention comprises:

determining an estimate of the relative phase and amplitude coefficients of a receiving channel for each antenna;

combining a received signal with the estimated coefficients to provide a composite signal;

determining a time of arrival of the received signal by correlating the composite signal with a delayed version of itself.

In related art, metrics used for synchronisation are based on outputs of correlators for the preamble of a packet. In the case of multiple receive antennae, a method for either combining or deriving a new method of metric generation for synchronisation is desirable. Related art schemes propose making decisions per antenna and then majority voting or adding the metrics prior to decision. Neither of these approaches addresses sufficiently the variation of the signal statistics across antennae. The net result of this is degraded synchronisation accuracy and increased packet loss rates. A further issue relates to the effective use of multiple antennae for data carriage but poor use of multiple antennae for synchronisation. In this case packets that could otherwise be decoded may be missed by the synchronisation module.

In this sixth embodiment, we disclose a method for determining per antenna metrics and for subsequent combining across antennae in order to generate a metric for time of arrival estimation. The method involves essentially two steps. The per antenna metrics are derived by correlating the received signal with a known preamble in a first step. The power of the sequences for each antenna is determined and added across antenna according to the time averaged weight based on estimated antenna signal strength. A threshold is then applied in order to determine the time of arrival.

A further aspect of the sixth embodiment relates to obtaining a rapid estimate of the relative phase and amplitude of the channel on each antenna and then to combine the received signal according to the conjugate of these coefficients. The processing would then proceed as in the related art with correlation of this composite signal with a delay version of itself. Application of this aspect of the sixth embodiment is in the synchronisation of wireless communication links involving the simultaneous use of multiple receive antennae where the multiple antennae are used to increase the robustness of the communications link primarily through increased diversity.

In a further aspect, the signals from each antenna are combined according to Minimum Mean Square Error criteria where the combining coefficients are dependent on a background noise measure on each antenna as well as the received signal energy. The processing would then proceed as in the related art with correlation of this composite signal with a delay version of itself.

It is particularly advantageous that the sixth embodiment provides for: a combining method for the metrics over antennae; currently does not require OFDM specific characteristics, and; a version with OFDM specificity may be defined for clarity.

It will be appreciated by those skilled in the art, that the invention is not restricted in its use to this particular application described, neither is the present invention restricted to its preferred embodiment with regards to the particular elements and/or features described or depicted herein. It will be appreciated that various modifications can be made without departing from the principles of the invention. Therefore, the invention should be understood to include all such modifications within its scope.

While this invention has been described in connection with specific embodiments thereof, it will be understood that it is capable of further modification(s). This application is intended to cover any variations uses or adaptations of the invention following in general, the principles of the invention and comprising such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof."

REFERENCES

[1] M. C. Reed, C. B. Schlegel, P. D. Alexander, and J. Asenstorfer, "Iterative multiuser detection for CDMA with FEC: Near-single-user performance," IEEE Trans. Commun., pp. 1693-1699, December 1998.

[2] S. Marinkovic, B. S. Vucetic, and J. Evans, "Improved iterative Parallel interference cancellation for coded CDMA systems," in the Proc. IEEE Int. Symp. Info. Theory, (Washington D.C.), p. 34, July 2001.

[3] D. E. Catlin, Estimation, Control, and the Discrete Kalman Filter, Springer Verlag, 1989.

[4] P. D. Alexander, A. J. Grant, and M. C. Reed, "Iterative detection on code-division multiple-access with error control coding," European Transactions on Telecommunications, vol. 9, pp. 419-426, September-October 1998.

The invention claimed is:

1. A method of communicating by tracking a plurality of time varying channels in a multiple access packet based communication network, each packet comprising a preamble portion including at least one data symbol, and a data portion including a plurality of data symbols, the method comprising:

initializing a channel estimate reference from an initial channel estimate based upon the at least one data symbol in a preamble portion of a received packet;

updating the channel estimate reference based upon a channel estimate of a current data symbol and at least one previously received data symbol from the plurality of data symbols in a data portion of the received packet, the updating comprising*:* generating the channel estimate for the current data symbol, updating the channel estimate reference based upon the channel estimate for the current data symbol, decoding the current symbol based upon the channel estimate for the current data symbol, updating a channel estimate for a data symbol directly preceding the current data symbol based upon time smoothing data and the channel estimate for the current data symbol, and re-decoding the data symbol directly preceding the current data symbol based upon the updated channel estimate therefor; [and]

repeating the updating upon receipt of at least one subsequent data symbol from the plurality of data symbols in the data portion of the received packet*; and*

*for each subsequent received data symbol, pipelining the steps of demodulating and modulating during the updating*.

2. The method according to claim 1 further comprising storing the channel estimate reference in a channel estimate database at a receiver device.

3. The method according to claim 1 further comprising transforming the channel estimate to a frequency domain prior to updating the channel estimate reference to provide a time smoothed channel estimate reference.

[4. The method according to claim 1 further comprising:

for each subsequent data symbol, during the updating, pipelining demodulating and modulating; and updating the channel estimate reference by performing a forward error correction (FEC) decoding.]

5. The method according to claim 1 wherein the multiple access packet based communication network comprises an orthogonal frequency-division multiplexing (OFDM) wireless network.

6. The method according to claim 5 wherein the updating of the channel estimate reference comprises calculations based upon at least one of a frequency domain statistic of a radio channel at an OFDM symbol rate, a time domain statistic of the radio channel across OFDM symbols, and outcomes of each decoded OFDM symbol.

7. The method according to claim 1 wherein the updating is performed on a data symbol-by-data symbol basis.

8. The method according to claim 1 wherein each previously received data symbol is decoded iteratively with each subsequent data symbol.

9. The method according to claim 1 wherein the updating based upon the current and the at least one previously received data symbols is performed in parallel.

10. The method according to claim 1 wherein the updating of the channel estimate reference is based upon the channel estimate of the current and all previously received data symbols.

11. A wireless communications device for communicating by tracking a plurality of time varying channels in a multiple access packet based communication network, each packet comprising a preamble portion including at least one data symbol, and a data portion including a plurality of data symbols, the wireless communications device comprising:

a [controller] *baseband receiver processor*; and a wireless transceiver [cooperating with] *incorporating* said [controller] *baseband receiver processor* for*:* initializing a channel estimate reference from an initial channel estimate based upon the at least one data symbol in a preamble portion of a received packet, updating the channel estimate reference based upon a channel estimate of a current data symbol and at least one previously received data symbol from the plurality of data symbols in a data portion of the received packet, the updating comprising:

generating the channel estimate for the current data symbol, updating the channel estimate reference based upon the channel estimate for the current data symbol, decoding the current symbol based upon the channel estimate for the current data symbol, updating a channel estimate for a data symbol directly preceding the current data symbol based upon time smoothing data and the channel estimate for the current data symbol, and re-decoding the data symbol directly preceding the current data symbol based upon the updated channel estimate therefor, and repeating the updating upon receipt of at least one subsequent data symbol from the plurality of data symbols in the data portion of the received packet.

12. The wireless communications device according to claim 11 wherein said [controller and] *baseband receiver processor of the* wireless transceiver [are for storing] *stores* the channel estimate reference in a channel estimate database at a receiver device.

13. The wireless communications device according to claim 11 wherein said [controller and] *baseband receiver processor of the* wireless transceiver [are for transforming] *transforms* the channel estimate to a frequency domain prior to updating the channel estimate reference to provide a time smoothed channel estimate reference.

14. The wireless communications device according to claim 11 wherein said [controller and] *baseband receiver processor of the* wireless transceiver, [are for:]

for each subsequent data symbol [during the updating, pipelining demodulating and modulating; and updating], *updates* the channel estimate reference by performing a forward error correction (FEC) decoding.

15. The wireless communications device according to claim 11 wherein the multiple access packet based communication network comprises an orthogonal frequency-division multiplexing (OFDM) wireless network.

16. The wireless communications device according to claim 15 wherein the updating of the channel estimate reference comprises calculations based upon at least one of a frequency domain statistic of a radio channel at an OFDM symbol rate, a time domain statistic of the radio channel across OFDM symbols, and outcomes of each decoded OFDM symbol.

17. The wireless communications device according to claim 11 wherein the updating is performed on a data symbol-by-data symbol basis.

18. The wireless communications device according to claim 11 wherein each previously received data symbol is decoded iteratively with each subsequent data symbol.

19. The wireless communications device according to claim 11 wherein the updating based upon the current and the at least one previously received data symbols is performed in parallel.

20. The method according to claim 1 wherein updating the channel estimate reference comprises error control based decoding.

21. The wireless communications device according to claim 11 wherein updating the channel estimate reference comprises error control based decoding.

22. A method of communicating by tracking a plurality of time varying channels in a multiple access packet based communication network, each packet comprising a preamble portion included at least one data symbol, and a data portion including a plurality of data symbols, the method comprising:

initializing a channel estimate reference from an initial channel estimate based upon the at least one data symbol in a preamble portion of a received packet;

updating the channel estimate reference based upon a channel estimate of a current data symbol and at least one previously received data symbol from the plurality of data symbols in a data portion of the received packet, the updating comprising*:* for each data symbol, demodulating the data symbol based upon the channel estimate, decoding the data symbol, generating training data by remodulating the decoded data symbol, updating [the] *a* channel estimate database based upon the training data, and generating the channel estimate for the data symbol based upon the updated channel estimate database;

repeating the updating upon receipt of at least one subsequent data symbol from the plurality of data symbols in the data portion of the received packet; and storing the channel estimate reference in [a] *the* channel estimate database at a received device.

23. A wireless communications device for communicating by tracking a plurality of time varying channels in a multiple access packet based communication network, each packet comprising a preamble portion including at least one data symbol, and a data portion including a plurality of data symbols, the wireless communications device comprising:

a [controller] *baseband receiver processor*; and a wireless transceiver [cooperating with] *incorporating* said [controller for initializing] *baseband receiver processor, the wireless transceiver initiating* a channel estimate reference from an initial channel estimate based upon the at least one data symbol in a preamble portion of a received packet, updating the channel estimate reference based upon a channel estimate of a current data symbol and at least one previously received data symbol from the plurality of data symbols in a data portion of the received packet, the updating comprising*:* for each data symbol, demodulating the data symbol based upon the channel estimate, decoding the data symbol, generating training data by remodulating the decoded data symbol, updating [the] *a* channel estimate database based upon the training data, and generating the channel estimate for the data symbol based upon the updated channel estimate database, repeating the updating upon receipt of at least one subsequent data symbol from the plurality of data symbols in the data portion of the received packet, and storing the channel estimate reference in [a] *the* channel estimate database at a receiver device.

*24. A method of estimating one or more time varying channels in a multiple access packet based communication network, each packet comprising a preamble portion including at least one preamble symbol, and a data portion including a plurality of data symbols, the method comprising:*

*initializing an initial channel estimate based upon the at least one preamble symbol in a preamble portion of a received packet;*

*updating the initial channel estimate to form updated channel estimates for a current data symbol and at least one previously received data symbol from the plurality of data symbols in a data portion of the received packet, the updating comprising:*

*generating a first channel estimate for the current data symbol based upon the initial channel estimate,*

*decoding the current data symbol based upon the first channel estimate for the current data symbol to form decoder outcomes, and*

*generating a second channel estimate for a data symbol directly preceding the current data symbol based upon the decoder outcomes remodulated without re-encoding, the updated channel estimates including at least the second channel estimate;*

*repeating the updating upon receipt of at least one subsequent data symbol from the plurality of data symbols in the data portion of the received packet; and*

*for each subsequent received data symbol, pipelining the steps of demodulating and modulating during the updating.*

*25. A wireless communications device for estimating one or more of time varying channels in a multiple access packet based communication network, each packet comprising a preamble portion including at least one preamble symbol, and a data portion including a plurality of data symbols, the wireless communications device comprising:*

*a baseband receiver processor; and*

*a wireless transceiver incorporating said baseband receiver processor and configured to perform:*

*initializing an initial channel estimate based upon the at least one preamble symbol in a preamble portion of a received packet,*

*updating the initial channel estimate to form updated channel estimates for a current data symbol and at least one previously received data symbol from the plurality of data symbols in a data portion of the received packet, the updating comprising:*

*generating a first channel estimate for the current data symbol based upon the initial channel estimate,*

*decoding the current data symbol based upon the first channel estimate for the current data symbol to form decoder outcomes,*

*generating a second channel estimate for a data symbol directly preceding the current data symbol based upon the decoder outcomes remodulated without re-encoding, the updated channel estimates including at least the second channel, and*

*repeating the updating upon receipt of at least one subsequent data symbol from the plurality of data symbols in the data portion of the received packet.*

*26. The method according to claim 1 further comprising: updating the channel estimate reference by performing a forward error correction (FEC) decoding.*

* * * * *